United States Patent
Laméy

(10) Patent No.: US 9,352,836 B2
(45) Date of Patent: May 31, 2016

(54) LAYERED MODULAR CONSTRUCTS AND PROCESSES THEREFOR

(71) Applicant: Kristofer Lamey, LLC, Smyrna, GA (US)

(72) Inventor: Kristofer Laméy, Smyrna, GA (US)

(73) Assignee: Kristofer Laméy, LLC, Smyrna, GA (US)

( * ) Notice: Subject to any disclaimer, the term of this patent is extended or adjusted under 35 U.S.C. 154(b) by 343 days.

(21) Appl. No.: 14/137,290

(22) Filed: Dec. 20, 2013

(65) Prior Publication Data

US 2014/0292170 A1 Oct. 2, 2014

Related U.S. Application Data

(60) Provisional application No. 61/740,763, filed on Dec. 21, 2012.

(51) Int. Cl.
*B64D 11/00* (2006.01)
*B64D 11/04* (2006.01)

(52) U.S. Cl.
CPC ........ *B64D 11/04* (2013.01); *B64D 2011/0046* (2013.01)

(58) Field of Classification Search
CPC ................. B64D 11/04; B64D 11/003; B64D 2011/0046
See application file for complete search history.

(56) References Cited

U.S. PATENT DOCUMENTS

| 8,439,589 | B2 * | 5/2013 | Winkler | B64D 11/003 403/119 |
| 2010/0021096 | A1 * | 1/2010 | Winkler | B64D 11/003 384/252 |

* cited by examiner

*Primary Examiner* — Brian M O'Hara
(74) *Attorney, Agent, or Firm* — Kaplan Intellectual Property Law, LLC; Barry E. Kaplan

(57) ABSTRACT

Modular constructs are disclosed wherein a plurality of structural members, most often parallel to one another, form spaced-apart layers. Clamping force, applied in some embodiments approximately perpendicularly to a face of each structural member through use of one or more tension assembly comprising a cable, rope, wire, rod, or the like, in association with one or more tubular spacer, is used to draw the structural members into alignment and to provide structural integrity of the modular construct. The subject matter of the present disclosure further relates to processes for creating such layered modular constructs. The subject matter of the present disclosure may find particular application within modular structures, such as, but not limited to, those for aircraft, boats, and other means of transportation, buildings, storage spaces, furniture and cabinetry, modular support systems for electronic equipment, support structures, interfaces, prosthetics, rack systems, modular work partitions, and the like.

26 Claims, 21 Drawing Sheets

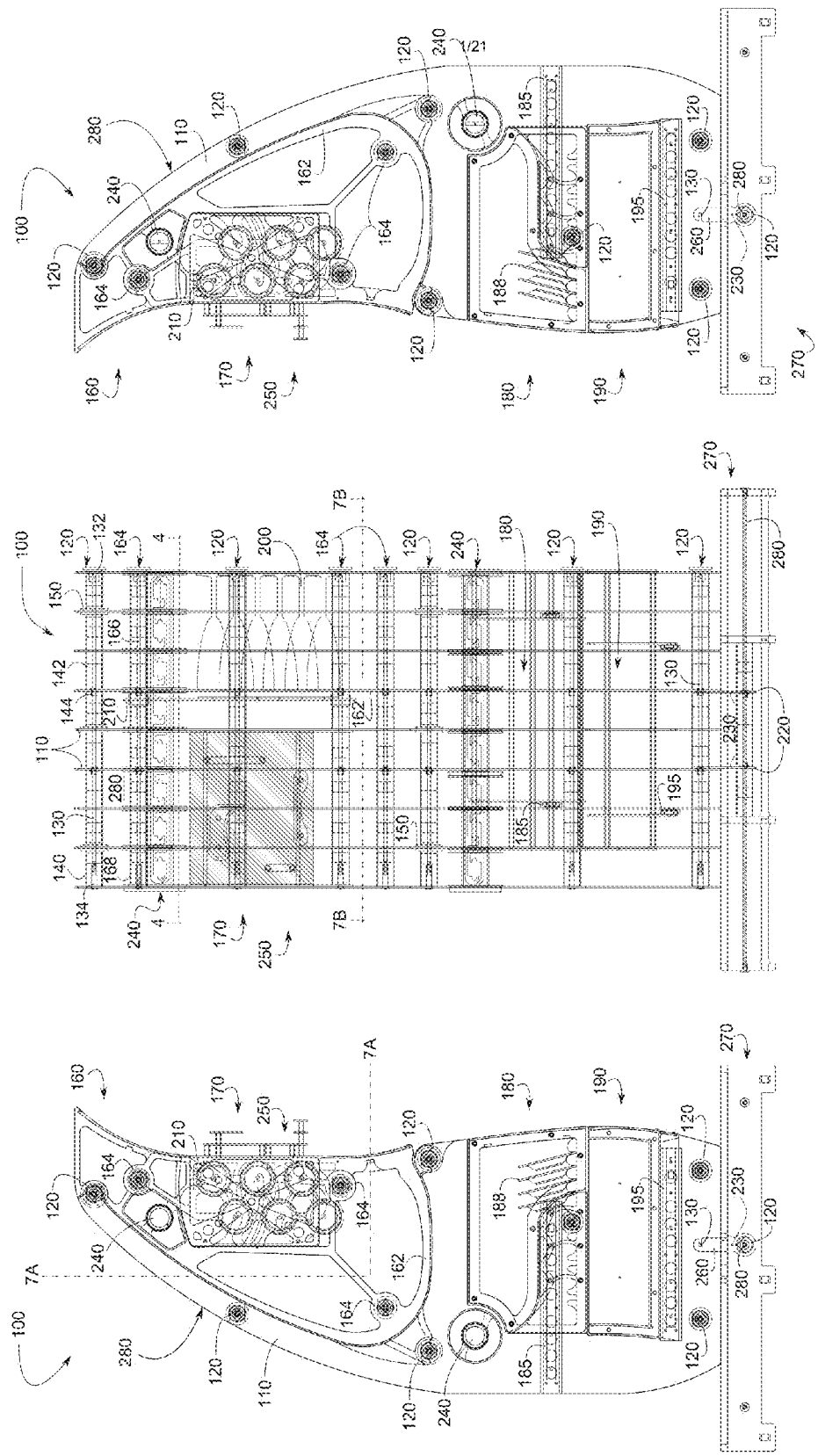

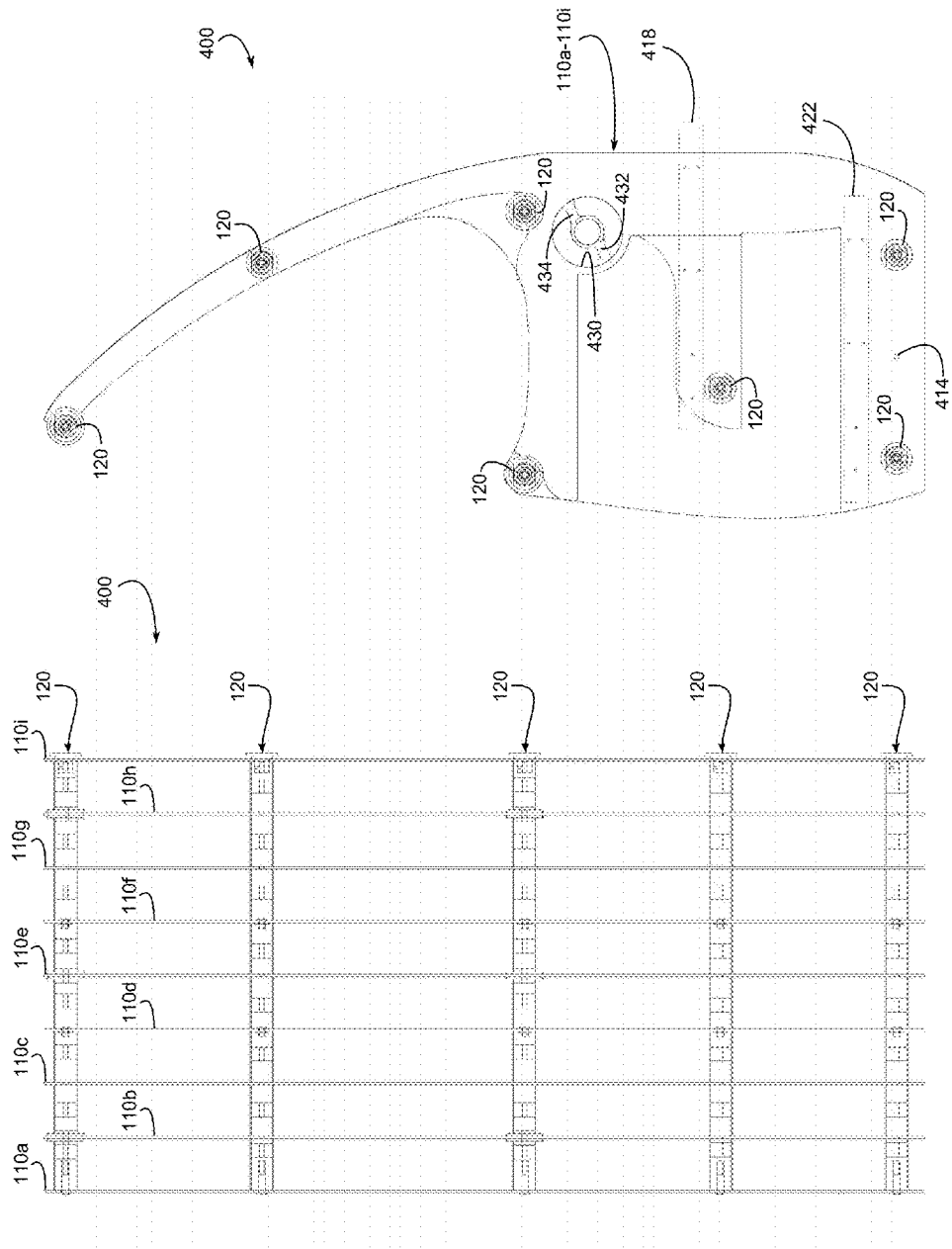

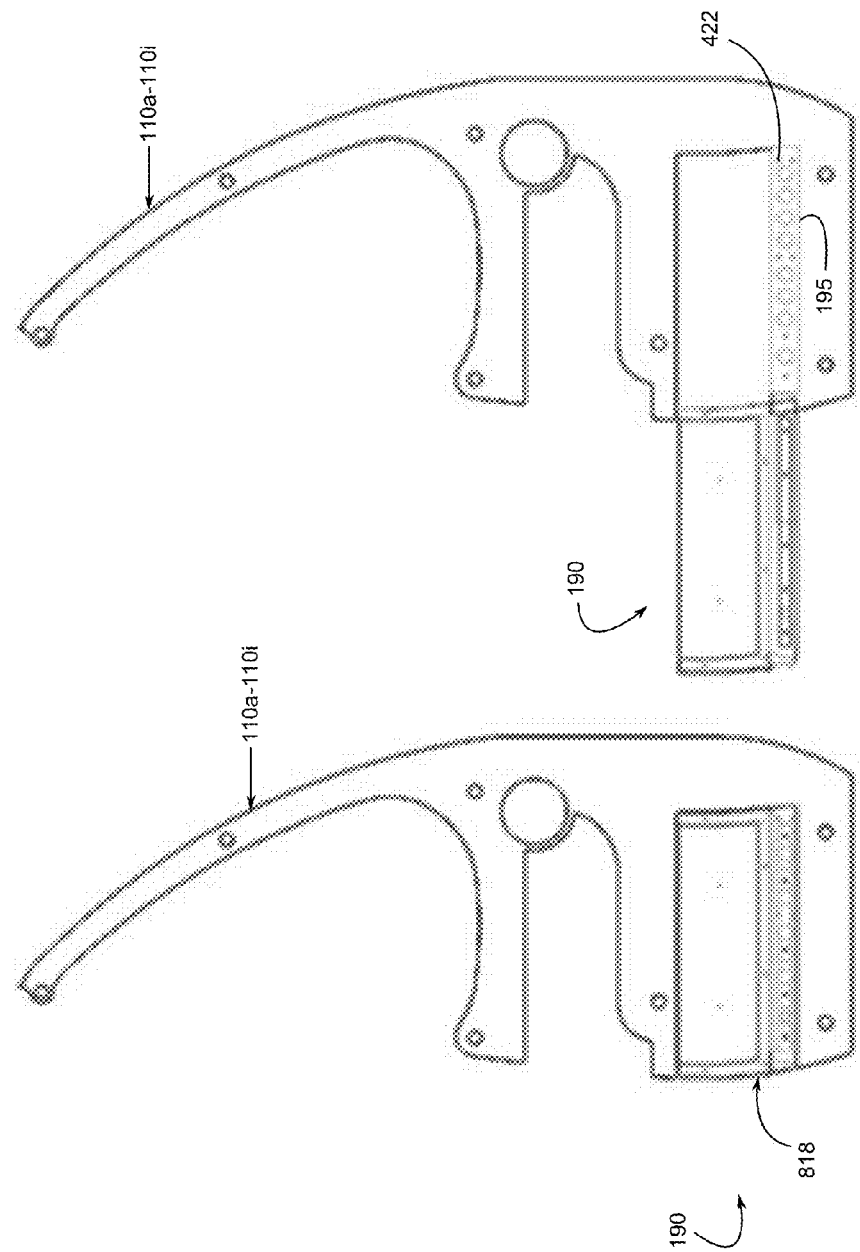

LAYERED MODULAR CONSTRUCTS AND PROCESSES THEREFOR

CROSS REFERENCE TO RELATED APPLICATIONS

The present application claims priority to U.S. provisional patent application No. 61/740,763, filed Dec. 21, 2012, entitled "Layered Modular Constructs and Processes Therefor," the entire contents of which are incorporated herein by reference.

TECHNICAL FIELD

The subject matter of the present disclosure relates, generally, to modular constructs and to processes for modular construction. More particularly, the subject matter of the present disclosure relates to layered modular constructs, and to processes for creating them, wherein clamping force is applied via cable, rope, wire, rod, or the like, in association with one or more tubular spacer, to draw spaced-apart structural members into alignment and to provide structural integrity of the modular construct.

BACKGROUND

As a structural design premise, form should always serve function. One explanation of this design premise is that the form of a structure should enhance, and not interfere with, or detract from, the function of the structure in view of its intended purpose and/or use. The same premise should apply, equally, to any smaller component, structure, or element affixed to and/or carried by the structure; as well, to any larger structure to which the structure is affixed and/or which will carry the structure.

While this design premise may be aspirational, it is observably not followed in many structural designs. This is not necessarily the fault of the designer, in that modern design philosophy has tended to be somewhat myopic, focusing on traditional design, manufacturing, fabrication, construction, and assembly techniques.

For example, modern modular constructs, and associated processes therefor, are most often premised upon box-like structures—rectangular structures comprising panel-like members exhibiting perpendicular surfaces. Load-carrying members of such structures typically are joined in perpendicular arrangement. That is, structural, load-carrying, panel-like members are most often joined or attached either at the respective ends of two perpendicularly arranged members, as in an "L"-shaped configuration, or at an end of one member and along a flat surface of an adjacent member perpendicular thereto, as in a "T"-shaped configuration.

In a significant number of applications, such box-like structures, and their resulting modular constructs, may be suboptimal for any of a variety of reasons.

For illustration, one might turn to a particularly exemplary application drawn generally from the cabinetry arts, as specifically applied in the field of private aircraft interior design and construction. In such an application, internal or interior modular structures, such as cabinetry for installation within an aircraft galley, must meet a variety of functional and service requirements, along with Federal Aviation Administration (FAA) regulations, flight-based technical specifications, and design constraints. One might appreciate that, while such modular structures must provide functionality similar to that provided by their conventional, ground-based counterparts, they must do so within an unconventional, difficult environment.

As might be apparent, internal or interior modular cabinet structures for aircraft galleys of the type described often function to support and hold coffee machines and other small appliances, glassware, tableware, flatware, serving pieces, wine bottles, drink containers, and a variety of foodstuffs. They provide countertop and working spaces. They provide drawer and storage spaces. They may be configured with sink, water supply, and drainage systems. They are typically wired for illumination and electrical service. They may have computer or other electronic interfaces. In private aircraft of the sort described, they often are finished with high-end, aesthetically pleasing surfaces.

And yet, while serving the conventional functions described above, aircraft internal or interior modular structures must fit and operate within an extremely tight, carefully allocated space. Not only must they support the above-described contents, as their ground-based counterparts must do, they must, further, safely constrain those contents against the vibrations and stresses arising during ground and flight-based operations. Uniquely, and as typically required by the laws and regulations of one or more countries, they must be designed, manufactured, tested, certified, and installed to meet the rigors of the aircraft industry.

For example, they must be fire resistant. They must be permanently markable, and marked, with identifying indicia sufficient to provide manufacturing traceability in the event of an in-air/in-service accident. They must be capable of withstanding significant gravitation, torsion, vibration, pressurization, and other forces. And they must be capable of withstanding those significant forces throughout long service cycles, often measured in tens of years, without degrading or failing. They must be quiet in the face of vibration, pressure changes, and other in-service stresses and strains to which they are subjected. They must be insulated against those routine, but extreme, temperature fluctuations to which an aircraft is subjected. They must, of course, be lightweight so as to reduce aircraft fuel consumption and, thereby, to increase operational range. For installation and service, they must fit through the relatively small entrance hatch of an aircraft. This represents, of course, only a small sampling of the many considerations attendant such aircraft internal or interior modular structures.

Notwithstanding the extreme environments, requirements, and constraints to which such aircraft internal or interior modular structures are subjected, they continue—disadvantageously—to be designed, manufactured, and assembled as high-tech, box-like structures. The following discussion seeks to convey an understanding of why such a box-like structure is disadvantageous with regard to the exemplary aircraft internal or interior modular structures under consideration.

In order to meet the significant stresses to which they are subjected, while remaining lightweight for the reasons described above, aircraft internal or interior modular structures are constructed using honeycombed-aluminum laminate materials. While these materials are lightweight, they are relatively expensive. Additionally, their principal strength lies along the length of the material. Across the thickness of the material, it is easily pierced, punctured, and crushed. This is, of course, not preferable, since manufacturing, assembly, packaging, transport, and installation processes must be carefully established to ensure that the honeycomb material is not damaged. Additionally, and by their very nature, such honeycombed, laminated materials are of non-uniform density and non-uniform strength; i.e., the center of each honeycomb is less dense and less strong than the surrounding cell wall. Thus, it should be relatively apparent that when trying to form L-joints and T-joints of the type most often used in constructing box-like modular structures, ordinary fasteners, such as screws, bolts-and-nuts, nails, and the like, are of little value.

Rather, and long ago, the aircraft industry adopted the use of panel pins and adhesives to join load carrying panel members. With such construction, a panel pin is embedded between panel members, typically within and between adjacent cells forming the honeycomb material of each panel, and the panel pin is adhered in-place through the use of high-fill adhesives and/or resins. As might be expected, this is an expensive, intensive, by-hand process, requiring custom clamps, fixtures, and/or jigs to hold the panels in fixed and appropriate relative orientation over the extended adhesive drying and cure times required.

Additionally, it will be appreciated that further use of adhesives, resins, and edge-fill products are required to form appropriately finished edges along any honeycombed material that has been cut. This, too, is an expensive, intensive, by-hand process, requiring extended drying and curing times.

Of course, once the aluminum honeycombed materials have been joined into a desired structure, they typically are overlaid, by hand, with appropriate finish materials. This portion of the aircraft internal or interior modular structure construction process typically requires further clamps, fixtures, jigs, tools, and techniques appropriate to the finishing task. Similarly, long drying and cure times are required.

As can easily be seen from this description, design and production cycles are long, requiring highly-skilled and experienced personnel. Repeatability between similar modular structures is often difficult, due to the nature of the by-hand processes. If in-process error or damage occurs, the modular structure often can be repaired only with great difficulty, or sometimes cannot be repaired at all, since joints are adhesively bonded. In any event, extreme care must be taken during any attempted repair or the modular structure may be further damaged.

For the same reasons, should a change order be entered for an existing aircraft internal or interior modular structure, such as may be necessary to upgrade or replace an appliance, or should the owner wish to reconfigure a galley space, for example, to add an appliance, to reconfigure storage spaces, or to modify galley functionality, the existing modular structure most often must be scrapped.

All the while, during this extensive and time-consuming process, an aircraft may lay dormant and out-of-service for weeks or months. When the aircraft internal or interior modular structure is finally ready for installation, it certainly cannot be transported to the aircraft and assembled in-situ; rather, the aircraft typically is flown to an accredited, well-tooled facility—which is most often remote from the aircraft owner's facility—where the aircraft internal or interior modular structure must be installed by specialized, highly-skilled, and experienced personnel.

Thus, as may be seen from the above description, manufacturing of such box-like modular constructs is time consuming and skilled-labor intensive, even when the design of the aircraft internal or interior modular structure is repeated over many units. There are few manufacturing efficiencies to be recognized. The process is heavily dependent upon a variety of clamps, fixtures, and/or jigs. Panel pins, along with adhesives, resins, and edge-fill products of differing types, specifications, and uses are required, with associated long drying and cure times. Configured spaces cannot easily be reconfigured without demolishing and rebuilding the entire structure, or a significant portion thereof. Even when such reconfiguration is possible, it may only be achieved through labor and material-intensive processes.

One might argue that advanced technologies, such as precision computer numerically controlled water jet cutting, plasma cutting, laser cutting, and the like, in combination with advanced, engineered materials of the types discussed above, are capable of producing customized, intricately shaped, flat panels at much higher speeds and throughputs than have been previously possible. While it is true that significant advances have been made in the types and precision of machines for the manufacture, fabrication, and assembly of parts, as well as significant advances in computerized design and manufacturing systems, as well as significant advancements in materials science, such advancements have most often been applied merely to increase the speed with which panels can be produced, and to increase individual-part dimensional accuracy, rather than being exploited to enable a true paradigm shift in the design of the modular structure itself. That is to say, notwithstanding the technological advancements described above, modern structural design philosophy has not heretofore recognized that such advancements may be used to enable the "form should always serve function" design premise; and, thereby, to take advantage of the many accompanying benefits. Rather, it is still most typical that modular constructs are designed and built as box-like forms.

Notwithstanding the above, even when considering human interface factors and ergonomics, box-like modular constructs of the type described are demonstrably suboptimal. Especially within the extremely tight, carefully allocated space of an aircraft galley, a box-like structure is intrusive, in that such structures are inherently bulky and space-monopolizing. Because available space is already tight, human interfaces become even more cumbersome: consider the space necessary to open a drawer or cabinet, and how the person opening that drawer or cabinet must position his or her body within the limited, available space to accommodate that function. Consider, also, how much of the preferred human envelope space—and its reasonably-required, associated functional space—is subordinated to the boundaries of the box-like form.

Furthermore, with box-like forms, adjacent spaces do not flow together naturally; rather, they are interrupted by the aesthetically unpleasing sharp corners and edges of that form. Additionally, such forms are not well-suited to the natural curvature of the human body—many injuries occur when persons attempt to move through tight spaces fitted with sharp-cornered, sharp-edged forms. And this is only exacerbated for high-mounted box-like forms.

In fact, with a box-like construct, the user must adapt to the space and modular configuration provided, rather than the space and modular construct supporting the user's functional and ergonomic needs. If considered honestly, one would conclude that this is not how a user should be required to interact with a workspace—or any other space. That is to say, in such suboptimal, conventional, prior art structures, function must adapt to meet the provided form, rather than the provided form being adapted to meet the necessary or desirable function, as was posited at the outset to be the aspirational design premise.

Although the aircraft internal or interior modular structure described above was chosen to illustrate certain deficiencies in use of the box-like form, there are numerous exemplary modular constructs to which the "form should always serve function" design premise might be extended. Such modular constructs may be seen with reference to any of a variety of modes of transportation, such as aircraft, boats, trains, trucks, equipment trailers, and personal vehicles; and to many of the living, storage, or support spaces attendant such modes of transportation. Such modular constructs may be seen with reference to buildings, wherein forms such as walls, fenestrations, and ancillary structures associated with the buildings may be found. Such modular constructs may be seen with reference to structures internally housed by buildings, wherein forms such as supports, platforms, and storage areas are required. Such modular constructs might also be seen with reference to specialty structures, such as prosthetics for human use, supports for electronic equipment, platforms for solar panels, rack systems, modular work partitions, and the like.

Accordingly, in considering the "form should always serve function" design aspiration set forth at the outset of this discussion, a desirable solution to the above-described deficiencies in the prior art modular constructs and related processes would allow one, in appropriate cases, to avoid the construction of box-like structures. Rather, such a solution would allow a designer to specify a modular construct that better enables a user to gain access to and operate within particularized functional parameters, without hindrance by bulky and space-monopolizing structures.

Such a solution would minimize or eliminate joinder of structural panels in "L" or "T"-shaped configurations. Such a solution would also minimize or eliminate the need to use advanced, expensive, honeycomb materials, while providing for use of materials having appropriate mechanical properties along length and across thickness, at the same time minimizing the required thickness—and, therefore, the weight—of such materials, and, at the end, providing a significantly stronger, yet lighter structure with conventional, relatively lower cost materials.

A desirable solution, further, would reduce or remove the need for use of conventional pins, fasteners, adhesives, bonding agents, edge-fill products, and the like. Of course, without the use of conventional fasteners, such a solution would allow a modular construct to be more rapidly assembled, with a minimal number of required tools, and without custom clamps, fixtures, and/or jigs to hold the panels in fixed and appropriate relative orientation during the assembly process.

A desirable solution would reduce design and production cycles. It would reduce the need for highly-skilled assemblers. It would allow for repeatability between similar modular structures. If in-process error or damage should occur, the modular structure could be easily and inexpensively repaired. Post-delivery or post-hoc reconfiguration and modification could more easily be handled, and with significantly less expense and downtime. Importantly, a desirable solution would allow convenient and relatively inexpensive transportation of unassembled components of a modular construct to a desired location, whereafter the modular structure could be efficiently assembled in-situ or on-site; thereby, minimizing or avoiding extended out-of-service situations.

A desirable solution would, of course, take advantage of the many benefits accompanying advanced manufacturing technologies, such as precision computer numerically controlled water jet cutting, plasma cutting, laser cutting, multi-axis milling and routing, three dimensional ("3D") printing, injection molding, and the like, while avoiding the need for skilled, by-hand lay-up and assembly processes.

A desirable solution would enhance, not detract from, human interface design and ergonomics. Rather, modular constructs built according to such a desirable solution would better flow into available spaces, reducing footprint and required operating space, while maintaining—or increasing—operational performance, user comfort, and user safety.

And a desirable solution would be useful and functional when applied to any of a variety of applications.

Thus, the "form should always serve function" design premise—and a desirable solution implementing it—would provide a paradigm shift in design, engineering, manufacturing, fabrication, construction, assembly, and/or like processes; in turn, leading to reductions in human labor, reductions in need for the wide variety of fasteners and corresponding assembly tools, reductions in assembly, manufacturing, and related costs, increases in efficiency, increases in design-to-finished-structure speed and predictability, more efficient and improved scalability, more efficient re-purposing and reconfiguring of the structure, decreased weight, increased usable space, and like benefits. In appropriate cases, such paradigm shift in design, manufacture, fabrication, construction, and/or assembly might provide stronger constructs, improved factors of safety, reductions in failure rates, tunable rigidity, flexibility, and/or vibrational damping within the modular construct, and like benefits, due to improvements in the way load carrying parts are used, combined, aligned, attached, and integrated into and within the structure.

Accordingly, it is to the disclosure of such modular constructs, processes for modular construction, and related systems that the following is directed.

SUMMARY

The subject matter of the present disclosure relates, in various embodiments, to modular constructs wherein a plurality of structural members, most often parallel to one another, form spaced-apart layers, and wherein clamping force, applied in some embodiments approximately perpendicularly to a face of each structural member through use of one or more tension assembly comprising a cable, rope, wire, rod, or the like, in association with one or more tubular spacer, is used to draw the structural members into alignment and to provide structural integrity of the modular construct.

According to some embodiments, a plurality of guiding offset rests aid similarly constructed, modular substructures in nesting into a primary modular structure, wherein each modular substructure comprises a plurality of structural members most often parallel to one another, forming spaced-apart layers, interconnected via one or more tension assembly.

Modular structures and/or substructures according to the present disclosure may carry one or more appliance mount, similarly constructed in layered, tensile-constrained form. Modular structures according to the present disclosure may further carry one or more drawer assembly and/or, in some embodiments, storage assembly, also similarly constructed in layered and tensile-constrained form. Additionally, modular structures according to the present disclosure may be configured so as to removably clasp and hold items, such as glassware or stemware, through the use of one or more sliding retaining layer.

In some embodiments, selected layers may be electrically connected to and energized by a transformer or other electrical source to provide electrical power for light features, appliances, equipment, or the like.

Appropriate structural mounts may be provided in order to removably affix modular structures according to the present disclosure to a floor, subfloor, footing, rail system, wall, or other support or structural interface.

In some embodiments, surface finishes may be applied in the form of snapped, clamped, magnetically or electro-magnetically attached, or press-fit outer layers, or skins, that are easily removable and replaceable.

Uniquely, all assemblies, subassemblies, and components are designed and configured to be easily assembled, tightened, loosened, and disassembled, both by module and by individual component, through a distinctive, single side access system, which, in most embodiments, requires use of only a single, modest tool. Modular structures according to the present disclosure advantageously may be entirely constructed, maintained, and/or reconfigured from a single side due to the layered structure and design of such modular structures, in association with tension assembly-based, layer-interconnection means. Layers within each assembly and/or subassembly are assembled in defined order in association with a relevant tension assembly. Upon completion of assembly, the tension assembly conveniently may be tightened from a single side of the modular structure, preferably making use of a single tool, such as a wrench. In some embodiments, a torque-measuring wrench may be utilized to assure that the modular assembly meets any predefined, applicable performance specifications.

Further, and importantly, should any maintenance and/or reconfiguration of a modular structure according to the present disclosure be required, one need simply loosen relevant tension assemblies from a single side of the modular structure, and subsequently remove only those component parts necessary to access the layer or feature of interest. One may then repair, maintain, replace, reconfigure, and/or the like, those component parts of interest; thereafter, replacing subsequent component parts in defined order in association with relevant tension assemblies. Upon completion of reassembly, relevant tension assemblies may be retightened from a single side of the modular structure.

The subject matter of the present disclosure further relates, in various embodiments, to processes for creating such layered modular constructs, wherein a designer can evaluate the space available, the functional requirements for use of that space, the highest, best, and most optimal configuration for that space, amongst other considerations, and provide an aesthetically pleasing, functionally and ergonomically superior configuration of modular structure that cannot be achieved by conventional methods. The layered design and construction of modular systems according to the present disclosure take best advantage of modern, high speed computer aided design and computer numerically controlled machinery. Parts are quickly and easily cut, identified, finished, inventoried (if desired), and the like. They can be picked and kitted from inventory, provided with assembly instructions, and quickly assembled through use of a single modest tool, or minimal tools. If desired, parts can be packaged in flat crates, shipped wherever needed, and easily assembled in situ.

The subject matter of the present disclosure may find particular application within modular constructs, such as, but not limited to, those for aircraft, boats, and other means of transportation, buildings, storage spaces, furniture and cabinetry, modular support systems for electronic equipment, support structures, interfaces, prosthetics, rack systems, modular work partitions, and the like.

These, and other, features, advantages, and benefits shown by the various embodiments of the layered modular constructs and related processes for creating them, as set forth within the present disclosure, will become more apparent to those of ordinary skill in the art after review of the following Detailed Description of Illustrative Embodiments and Claims in light of the accompanying drawing Figures.

BRIEF DESCRIPTION OF THE DRAWINGS

Accordingly, the within disclosure will be best understood through consideration of, and with reference to, the following drawing Figures, viewed in conjunction with the Detailed Description of Illustrative Embodiments referring thereto, in which like reference numbers throughout the various Figures designate like structure, and in which:

FIG. 1 depicts an embodiment of a front elevation view of an aircraft interior modular system, in accordance with the subject matter of the present disclosure;

FIG. 2 depicts a first side elevation view of the aircraft interior modular system of FIG. 1, in accordance with the subject matter of the present disclosure;

FIG. 3 depicts a second side elevation view of the aircraft interior modular system of FIG. 1, in accordance with the subject matter of the present disclosure;

FIG. 8A depicts a front elevation view of a support layer assembly of the aircraft interior modular system shown in FIG. 1, in accordance with the subject matter of the present disclosure;

FIG. 8B depicts a side elevation view of the support layer assembly of FIG. 8A, in accordance with the subject matter of the present disclosure;

FIG. 12A depicts a side elevation view of a support layer assembly of the aircraft interior modular system shown in FIG. 1, further illustrating a lower drawer assembly, in closed position, associated with the referenced support layer assembly, in accordance with the subject matter of the present disclosure;

FIG. 12B depicts a side elevation view of a support layer assembly of the aircraft interior modular system shown in FIG. 1, further illustrating a lower drawer assembly, in open position, associated with the referenced support layer assembly, in accordance with the subject matter of the present disclosure;

Figure 4:
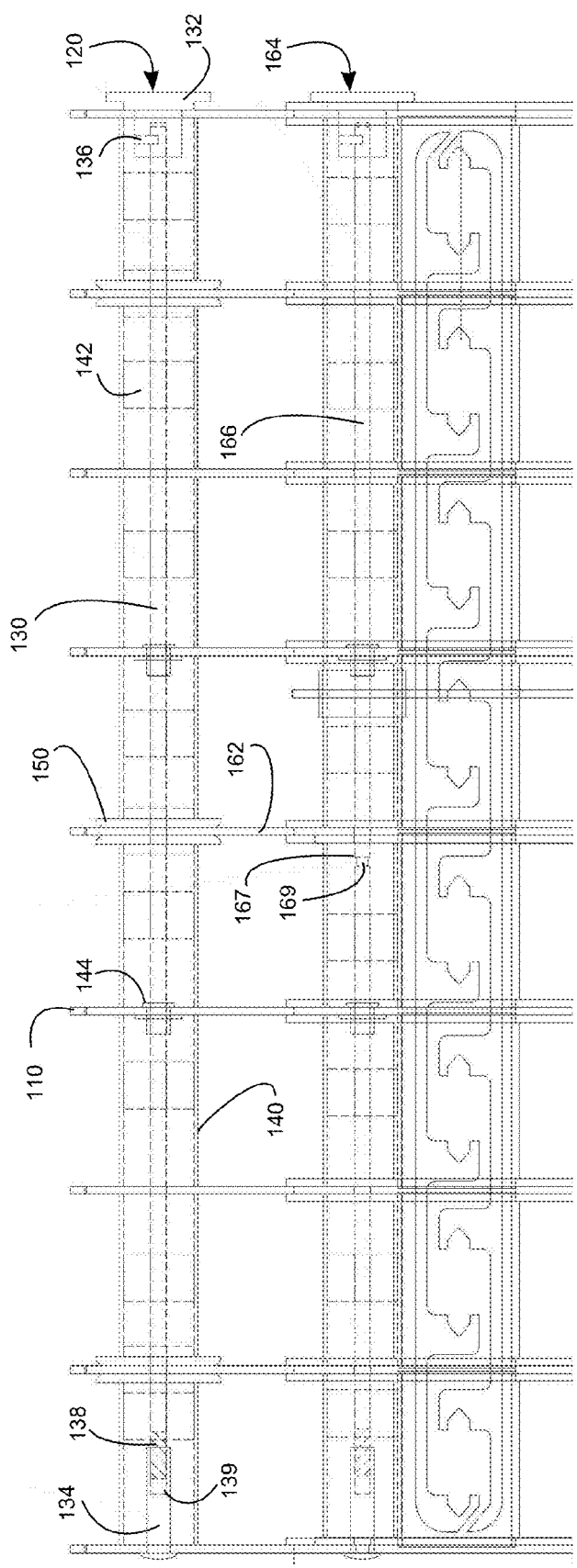
FIG. 4 depicts a front elevation view of two tension rod assemblies and a portion of a lighting assembly contained within an upper portion of the aircraft interior modular system of FIG. 1, in accordance with the subject matter of the present disclosure.
Figure 5B:
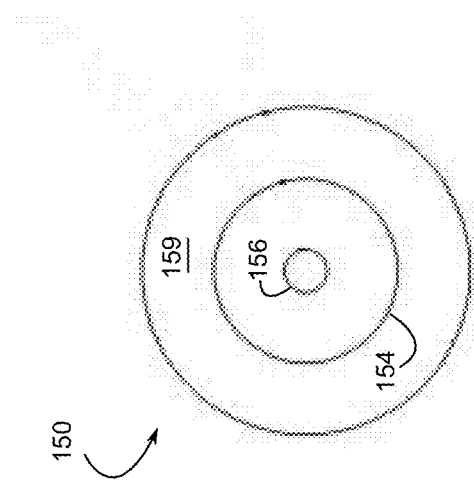
FIG. 5B depicts a plan view of the guiding offset rest of FIG. 5A, in accordance with the subject matter of the present disclosure.
Figure 5A:
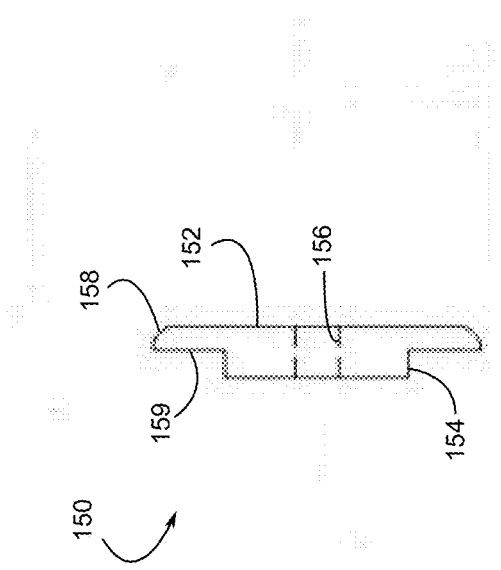
FIG. 5A depicts an edge view of a guiding offset rest for use in association with the aircraft interior modular system of FIG. 1, in accordance with the subject matter of the present disclosure.
Figure 5D:
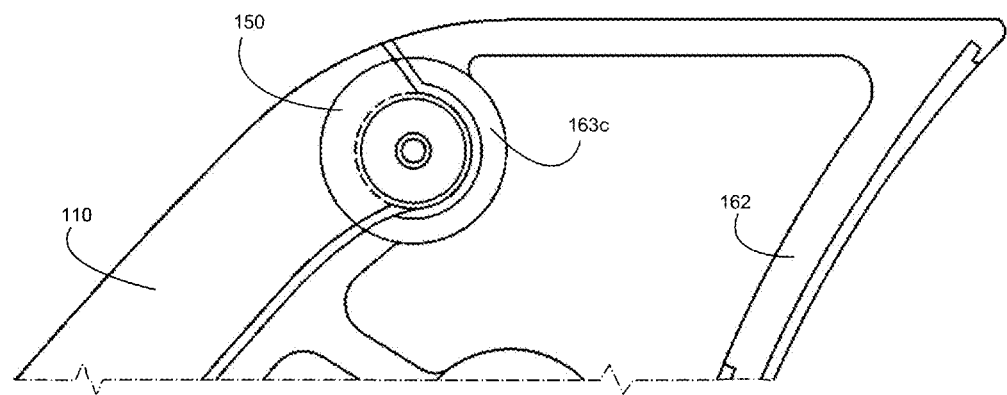
FIG. 5D depicts a partial elevation view of a lower portion of a cradle assembly of the aircraft interior modular system of FIG. 1, in accordance with the subject matter of the present disclosure.
Figure 5C:
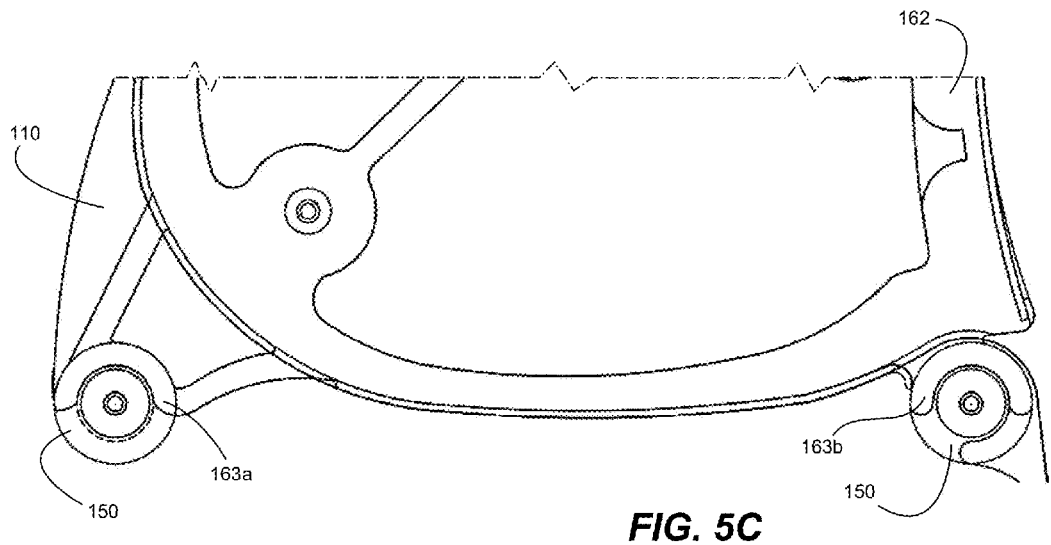
FIG. 5C depicts a partial elevation view of an upper portion of a cradle assembly of the aircraft interior modular system of FIG. 1, in accordance with the subject matter of the present disclosure.

It is to be noted that the drawings presented are intended solely for the purpose of illustration and that they are, therefore, neither desired nor intended to limit the subject matter of the present disclosure to any or all of the exact details of construction shown, except insofar as they may be deemed essential to the claimed subject matter.

DETAILED DESCRIPTION OF ILLUSTRATIVE EMBODIMENTS

In describing the several embodiments illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose. Additionally, in the Figures, like reference numerals shall be used to designate corresponding parts throughout the several Figures.

Headings are provided for the convenience and guidance of the reader. They are not intended, nor should they be construed, to be limiting in view of the various and varying embodiments of the subject matter of the present disclosure, whether such subject matter is found under a particular heading or elsewhere in the Specification and/or Figures.

The present disclosure relates to mechanical structures, including modular structures, intended to support or resist loads. As was discussed at the outset, in many applications, such mechanical structures—and specifically, modular structures—suffer from a variety of deficiencies inherent to their prevalent, box-like forms. The subject matter of the present disclosure is intended to offer, where appropriate to the particular application, a far superior solution to the use of such box-like forms.

1. Overview

Accordingly, an exemplary embodiment demonstrating at least a portion of the subject matter of the present disclosure may be seen with reference to FIGS. 1-3, wherein is shown aircraft interior modular system (sometimes hereinafter, "AIMS") 100 taking the form of cabinetry-like structure for installation within an aircraft galley. AIMS 100 is seen, generally, to comprise a form wherein a plurality of structural members 110, most often parallel to one another, form spaced-apart layers. Clamping force, applied in some embodiments approximately perpendicularly to a face of each structural member 110 (sometimes hereinafter, a "layer" or "layers") through use of one or more tension assembly 120 comprising a cable, rope, wire, tension rod 130, or the like, in association with one or more tubular spacer 140 (sometimes hereinafter called an "offset tube"), is used to draw structural members 110 into alignment and to provide structural integrity of the AIMS 100 modular construct.

A plurality of guiding offset rests 150 (sometimes hereinafter called a "GOR" or "GORs") allows modular substructures, such as cradle assembly 160, to nest into, or to be otherwise held by and/or within, AIMS 100. Cradle assembly 160, like the overall AIMS 100, comprises a plurality of structural members 162, most often parallel to one another, forming spaced-apart layers. Clamping force, applied in some embodiments approximately perpendicularly to a face of each structural member 162 (sometimes hereinafter, a "layer" or "layers") of cradle assembly 160 through use of one or more tension assembly 164 comprising a cable, rope, wire, tension rod 166, or the like, in association with one or more tubular spacer 168 (sometimes hereinafter called an "offset tube"), is used to draw structural members 162 into alignment and to provide structural integrity of modular cradle assembly 160 construct.

AIMS 100 may carry one or more appliance mount 170, similarly constructed in layered, tensile-constrained form. AIMS 100 may further carry one or more upper drawer assembly 180 and/or lower drawer assembly 190 (or, in some embodiments, storage assembly 190), also similarly constructed in layered and tensile-constrained form. Additionally, AIMS 100 may be configured so as to removably clasp and hold items, such as glassware or stemware 200, through the use of sliding retaining layers 210. Upper drawer 180 and/or lower drawer or storage assembly 190 preferably operate on slide rail assemblies 185, 195. Drawer 180 may be configured so as to support and carry any of a variety of tableware or dishware 188, flatware, serving pieces, and the like. Similarly, storage assembly may be configured to support and carry, for example, wine bottles, drink containers, and a variety of foodstuffs.

In some embodiments, selected layers 220 may be electrically connected to and energized by transformer 230 to provide electrical power for light features 240, appliances 250, equipment, or the like. In some embodiments, transformer 230 may comprise a 300 watt, 12 volt transformer; however, it will be appreciated that transformer 230 may be selected and/or specified so as to meet the electrical requirements of a particular modular system constructed according to the present disclosure.

Appropriate structural mounts 260 may be provided in order to removably affix AIMS 100 to a floor, subfloor, footing, rail system, wall, or other support or structural interface, such as interface 270. In some embodiments, structural mounts 260 may be disposed and attached at one end thereof to rail or rod system 280 within interface 270. An opposite end of structural mounts 260 may rotate over and hook onto, or (in some embodiments) into, tension rod 130. Following tightening of tension assembly 120, structural mounts 260 function so as to hold AIMS 100 to support or structural interface 270, via, for example, rail or rod system 280.

In some embodiments, individual layers 110, 162, and the like, may be finished—in the case of aluminum material layers, for example—by uniquely colored anodize coatings in order to aid identification of parts and rapid assembly thereof. That is to say, in some embodiments, different or differing colors may be applied to different parts of AIMS 100 in order to aid identification of parts and rapid assembly thereof. Surface finishes may be applied in the form of snapped, clamped, magnetically or electro-magnetically attached, or press-fit outer layers 280, or skins, that are easily removable and replaceable.

Uniquely, all assemblies, subassemblies, and components are designed and configured to be easily assembled, tightened, loosened, and disassembled, both by module and by individual component, through a distinctive, single side access system, which, in most embodiments, requires use of only a single, modest tool, or minimal tools.

Now, turning attention to FIGS. 4-15, selected portions of the subject matter of the present disclosure will be further and more particularly described.

2. Tension Assemblies and Guiding Offset Rests

In FIG. 4, tension assembly 120 is shown in greater detail. Tension rod 130 traverses AIMS 100 from tension cap 132, shown in this embodiment on the right, to terminating end 134, shown in this embodiment on the left. Tension rod 130 may be attached to tension cap 132 via means such as pin 136, although other means of attachment may be utilized in an appropriate embodiment. Tension rod 130 may carry external threads 138 on an end thereof, so as to cooperatively engage terminating end 134, which may carry internal threads 139 therewithin for such purposes. At least a portion of terminating end 134 is preferably engaged within a leftmost structural member 110 so as to prevent rotation and/or dislodgement of terminating end 134 during interaction with tension rod 130.

Tension rod 130 can be seen to traverse each of a plurality of structural members 110. Tension rod 130 further passes through a plurality of offset tubes 140. Offset tubes 140 are disposed approximately perpendicular to a face of each so-engaged structural member 110, and they bridge and space-apart each structural member 110. It can be seen that, when tension rod 130 is tightened via tension cap 132, it threads into terminating end 134, and a tensile force is established therewithin. Tension rod 130 thereby acts to apply a corresponding compression force to each engaged structural member 110, which members are, in the embodiment of FIG. 4, the leftmost and rightmost structural members 110. This compression force is, in-turn, transmitted via each associated offset tube 140 to each succeeding structural member 110. Accordingly, such configuration acts to draw structural members 110 into alignment and to provide the required structural rigidity and integrity of the AIMS 100 modular construct.

In some embodiments, internal offset tube retainer 142 may be fit within, and/or between, one or more offset tube 140 in order to better constrain and orient tension rod 130. Internal offset tube retainer 142 may act to center and to uniformly guide tension rod 130 through and across the AIMS 100 structure. It may further act to reduce bending of tension rod 130 during assembly and reduce vibration.

In some embodiments, bushing 144 may be fit within one or more structural member 110. Similar in function to internal offset tube retainer 142, bushing 144 may aid in better constraining and orienting tension rod 130; likewise, centrally and uniformly guiding tension rod 130 through and across the AIMS 100 structure. Bushing 144 may further act to reduce bending of tension rod 130 during assembly and reduce vibration.

Importantly, guiding offset rests, or GORs, 150 are fit in appropriate locations between selected ones of offset tubes 140. Best seen with reference to FIGS. 5A and 5B, GORs 150 are preferably round, metallic retainers, comprising flat face 152 on one side and boss 154 on a second side. Central hole 156 passes through GOR 150, with flat face 152 and boss 154 approximately concentric therewith. Flat face 152 is preferably tapered or chamfered toward the side of GOR 150 carrying boss 154 for purposes that will be described below.

With continuing reference to FIGS. 1 and 4, it can be seen that central hole 156 permits tension rod 130 to pass through GORs 150. Boss 154 fits within offset tube 140, the tubular end thereof bearing against flat surface 159. As described in greater detail hereinbelow, tension rod 130 also passes through an aligned clearance hole (see, e.g., FIG. 8C) within each structural member 110, such that, when fully assembled, a lower portion of face 152 of each GOR 150 bears against structural member 110. So configured, and with reference to FIGS. 5C and 5D, it can be seen that mounting tabs 163a, 163b, 163c of structural member 162 of cradle assembly 160 fit between an upper portion of flat faces 152 of two confronting GORs 150 and rest against associated portions of GOR 150, structural member 110, and/or the tension rod. Structural member 162 is urged into position and alignment between flat faces 152 by tapered or chamfered surfaces 158. When tension rod 130 is tightened, compression force is transferred through tension assembly 120 and structural members 110, all as described hereinabove. GORs 150, in turn, provide corresponding compression force to structural members 162, through mounting tabs 163a, 163b, 163c, drawing structural members 162 into appropriate alignment with the AIMS 100 structure, and providing the required structural rigidity and integrity of cradle assembly 160 within the AIMS 100 modular construct. Thus, GORs 150 allow modular substructures, such as cradle assembly 160, to interface with, and be removably held within, AIMS 100, all as described in greater detail hereinbelow.

Returning to FIG. 4, further shown therein is tension assembly 164. Tension assembly 164, operating in association with cradle assembly 160, comprises equivalent component parts—and functions much the same way—as does tension assembly 120, operating in association with AIMS 100. Advantageously, through use of tension assembly 164, modular substructures, such as cradle assembly 160, can be formed with equivalent construction, attributes, and properties as the larger, carrying structure, in this example, AIMS 100. Accordingly, each modular substructure and/or subassembly easily can be manufactured and assembled in the preferred, layered form described herein, with all of the associated features, conveniences, advantages, and benefits.

In some embodiments of the subject matter of the present disclosure, such as those carrying appliance mount 170, tension rod 166 may be formed with one or more shoulder 167 falling off to smaller-diameter portion 169 of tension rod 166. As will be described in greater detail hereinbelow with reference to FIGS. 7A and 7B, when tension rod 166 is loosened, shoulder 167 is drawn rightwardly (in the embodiment of FIGS. 1-4). When operable in association with an appliance mount 170 bracket having appropriate constraint and clearance configuration, smaller-diameter portion 169 of tension rod 166 meets the bracket and enables the appliance to be removed from the structure of AIMS 100.

Figure 6A:
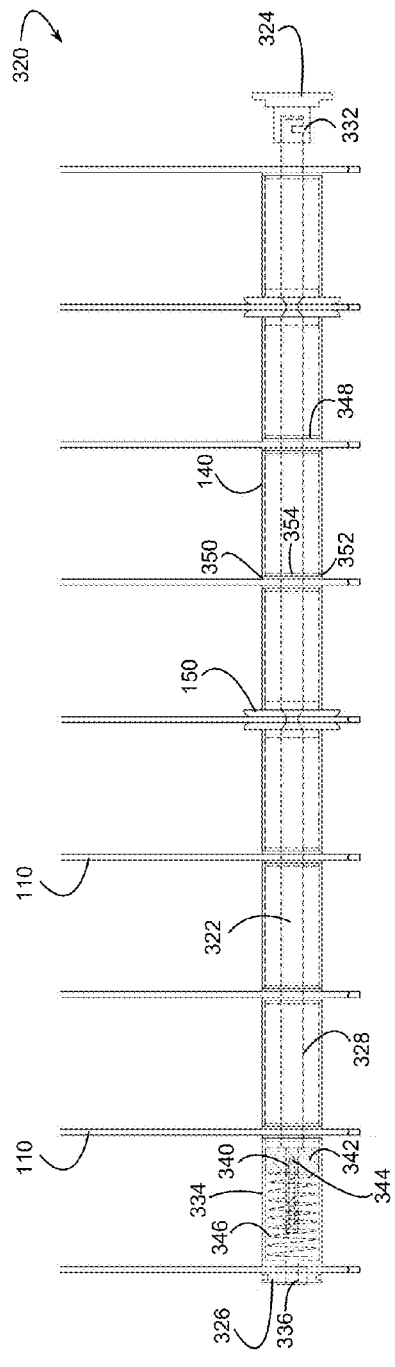
FIG. 6A depicts an alternate embodiment of a tension assembly according to the subject matter of the present disclosure in a released position, in accordance with the subject matter of the present disclosure.
Figure 6B:
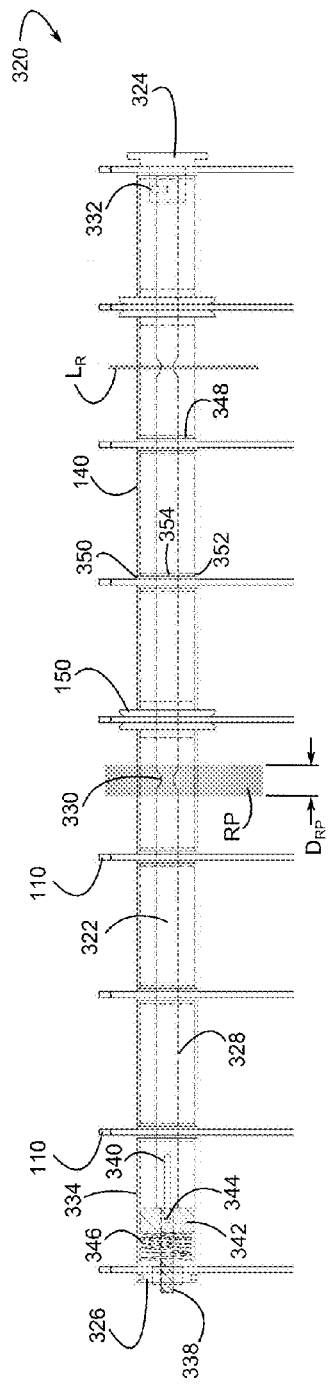
FIG. 6B depicts the tension assembly of FIG. 6A in a locked position, in accordance with the subject matter of the present disclosure.

Turning next to FIGS. 6A and 6B, an alternate embodiment of a tension assembly according to the subject matter of the present disclosure is shown. FIG. 6A depicts tension assembly 320 in a released position; whereas, FIG. 6B depicts tension assembly 320 in a locked position. As shown in FIGS. 6A and 6B, tension assembly 320 corresponds most closely in form, placement, and function to tension assembly 120; however, it will be appreciated that tension assembly 320 may be configured, as appropriate to the circumstances and need, for operation within an assembly, such as AIMS 100, a subassembly, such as cradle assembly 160, or any other appropriate modular construct formed in accordance with the subject matter of the present disclosure.

Tension assembly 320 comprises variable diameter tension rod 322 (sometimes hereinafter, a "VTR") which traverses AIMS 100 from tension cap 324, shown in this embodiment on the right, to terminating end 326, shown in this embodiment on the left. It may be seen that variable diameter tension rod 322 comprises regions in which its typical outside diameter 328 smoothly necks-down to one or more minimum-diameter regions 330, whereafter it smoothly necks-up to its typical outside diameter 328. Variable diameter tension rod 322 may be attached to tension cap 324 via means such as pin 332, although other means of attachment may be utilized in an appropriate embodiment.

Terminating end 326 engages and captures terminating dynamic offset 334. At least a portion of terminating dynamic offset 334 is engaged within a leftmost structural member 110 and terminating end 326, so as to prevent rotation and/or dislodgement during interaction with VTR 322. One or both of terminating end 326 and/or terminating dynamic offset 334 may carry internal threads 336, so as to cooperatively engage external threads 338 disposed for such purposes on VTR 322. Terminating dynamic offset 334 is formed with slot 340, which may be seen to cooperatively engage, and interact with, slot guided rod retainer 342 associated with and carried adjacent, but inset from, a leftmost end of VTR 322. Slot guided rod retainer 342 carries pin 344 for cooperative, sliding-type engagement with slot 340. Carried within terminating dynamic offset 334 is spring 346. Spring 346 acts to bear against slot guided rod retainer 342 and bias lateral motion of VTR 322.

VTR 322 can be seen to traverse each of a plurality of structural members 110. VTR 322 further passes through a plurality of selectively arranged GORs 150 and/or offset tubes 140. Offset tubes 140 are disposed approximately perpendicular to a face of each so-engaged structural member 110 and/or GOR 150, and they bridge and space-apart each structural member 110.

In some embodiments, external/internal offset tube retainer 348 comprises outer diameter 350 approximately matching the outer diameter of offset tube 140. External/internal offset tube retainer 348 further comprises a boss of smaller diameter 352 approximately matching the inner diameter of offset tube 140. Accordingly, smaller diameter 352 of external/internal offset tube retainer 348 may be fit within the inner diameter of offset tube 140, so that outer diameter 350 may bear against a face of structural member 110. In some embodiments, external/internal offset tube retainer 348 may be formed with central hole 354 to enable VTR 322 to pass therethrough. Accordingly, external/internal offset tube retainer 348 aids in constraining and orienting offset tubes 140 and VTR 322 in association with tension assembly 320. External/internal offset tube retainer 348 may act to center and to uniformly guide VTR 322 through and across the AIMS 100 structure. It may further act to reduce bending of VTR 322 during assembly and to reduce vibration.

It can be seen that, when VTR 322 is tightened via tension cap 324, it threads into one or both of terminating end 326 and/or terminating dynamic offset 334, laterally moving slot guided rod retainer 342—which is constrained by cooperating engagement of slot 340 and pin 344—toward terminating end 326 (leftwardly in this embodiment) and compressing spring 346. VTR 322 thereby acts to apply a compression force to each engaged structural member 110, which members are, in the embodiment of FIGS. 6A and 6B, the leftmost and rightmost structural members 110. This compression force is, in-turn, transmitted via each associated offset tube 140 to each succeeding structural member 110. Accordingly, such configuration acts to draw structural members 110 into alignment and to provide the required structural rigidity and integrity of the AIMS 100 modular construct.

Figure 7B:
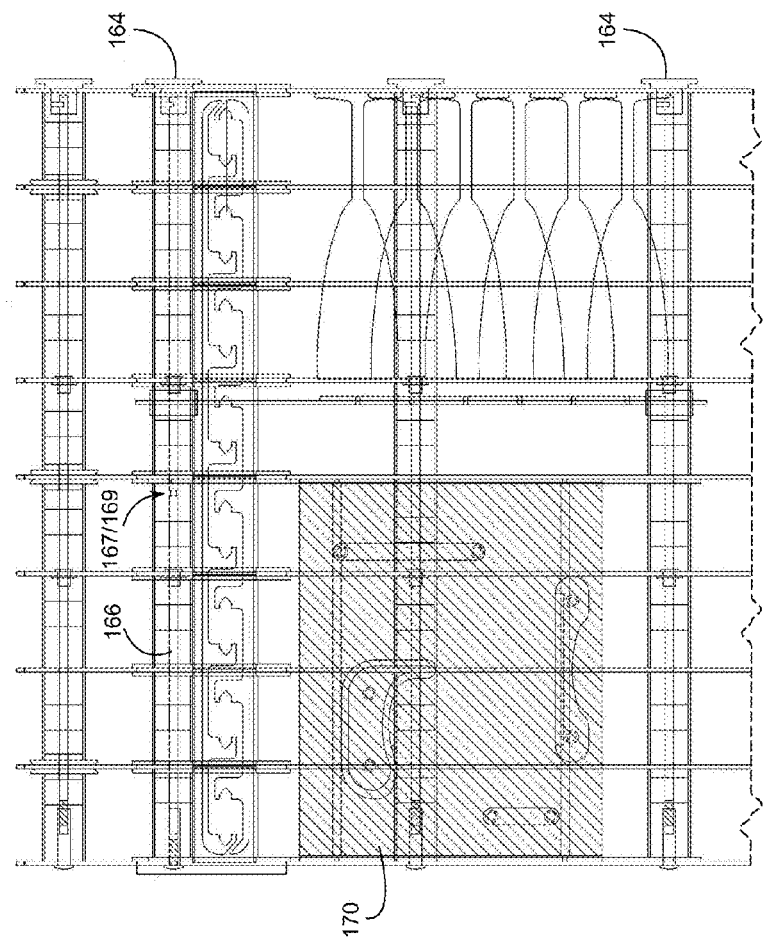
FIG. 7B depicts a front elevation view of an appliance mount and bracket contained within an upper portion of the aircraft interior modular system shown in FIG. 1, in accordance with the subject matter of the present disclosure.
Figure 7A:
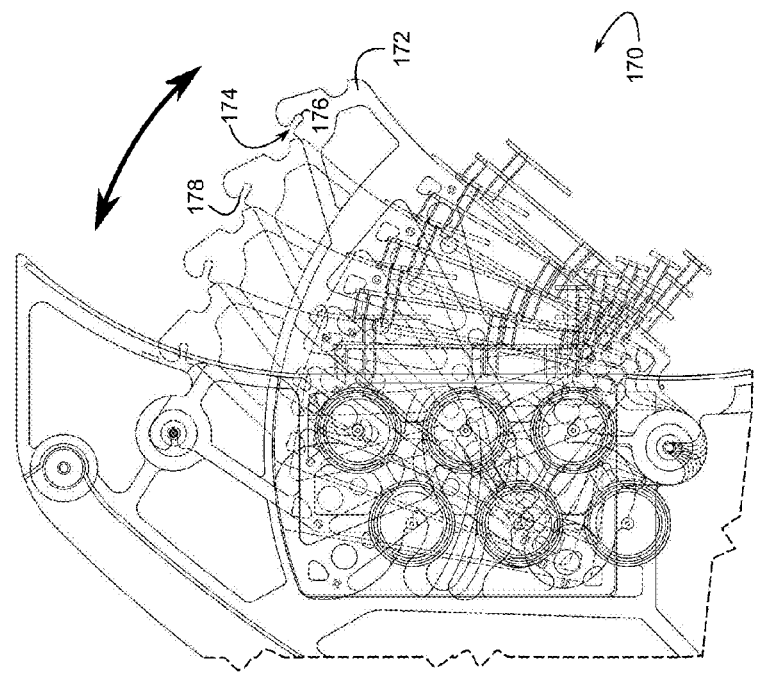
FIG. 7A depicts a side elevation view of an appliance mount and bracket contained within an upper portion of the aircraft interior modular system shown in FIG. 3, in accordance with the subject matter of the present disclosure.

As may be observed with reference to FIGS. 7A and 7B, when VTR 322 is loosened, each minimum-diameter region 330 is moved in the direction of tension cap 324 (rightwardly in this embodiment), through a distance $D_{RP}$ defined by release parameter RP, aided in said motion by operation of spring 346 bearing against slot guided rod retainer 342, but constrained by cooperating engagement of slot 340 and pin 344. When a line of release $L_R$, corresponding to each minimum-diameter region 330, aligns with a bracket having appropriate constraint and clearance configuration, minimum-diameter region 330 of VTR 322 meets the bracket and enables release of said bracket from the structure of AIMS 100. Advantageously, spring 346 acts to bias and hold VTR 322 in an appropriate position for bracket release. Additionally, through cooperative interaction of terminating dynamic offset 334 with spring 346-biased, slot guided rod retainer 342, a user can affirmatively sense when tension assembly 320 is unlocked and correctly aligned for bracket release.

With the above-provided understanding of the construction and operation of tension rod 166, as best seen in FIG. 4, and VTR 322, as best seen in FIGS. 6A and 6B, the reader's attention is now directed to FIGS. 7A and 7B. In this embodiment, mounting brackets 172 are disposed so as to carry appliance mount 170. Mounting brackets 172 comprise variable width slot 174. Best seen with reference to FIG. 7A, the width of slot 174 is greater within its terminal portion 176 than within its lead-in portion 178.

As was described hereinabove, tension rod 166 may be formed with one or more shoulder 167 falling off to smaller-diameter portion 169 of tension rod 166, all as best seen with reference to FIG. 4. Under circumstances wherein appliance mount 170 and mounting brackets 172 are fully engaged with tension assembly 164, and tension assembly 164 is in tightened configuration, smaller diameter portion 169 of tension rod 166 is disposed away from mounting brackets 172. Thus, larger diameter portions of tension rod 166 are disposed within terminal portions 176 of slots 174. Because these larger diameter portions of tension rod 166 cannot pass through the smaller width lead-in portions 178 of mounting brackets 172, appliance mount 170 is locked firmly into place.

On the other hand, when tension rod 166 is loosened, shoulder 167 is drawn rightwardly (in the embodiment of FIG. 7B), wherein smaller-diameter portions 169 of tension rod 166 are then disposed within terminal portions 176 of slots 174. Because these smaller-diameter portions 169 of tension rod 166 are of sufficiently small cross-section to be able to pass through the smaller width lead-in portions 178 of mounting brackets 172, appliance mount 170 is unlocked. In its unlocked position, appliance mount 170 can be rotated out of engagement with tension rod 166; and, thereafter, appliance mount 170 can be removed for maintenance, reconfiguration, or the like.

It will be apparent that, in appropriate modular construct embodiments, alternate embodiment tension assembly 320, best seen with reference to FIGS. 6A and 6B, may be utilized in lieu of tension assembly 164 just described. It will also be apparent that, in appropriate modular construct embodiments, variable diameter tension rod 322, or a modified version thereof, may be substituted for tension rod 166 within tension assembly 164.

3. Support Layer Assembly

Figure 8C:
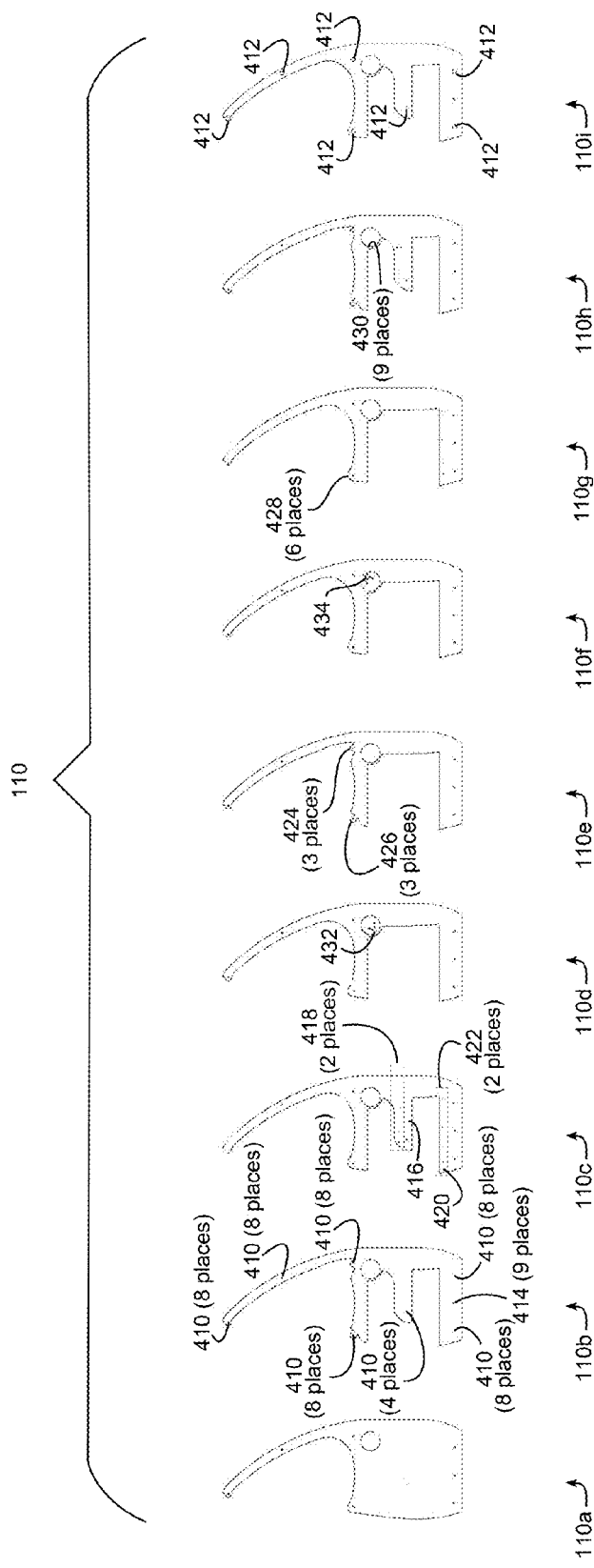
FIG. 8C depicts an exploded side elevation view detailing each support layer shown in FIGS. 8A and 8B, in accordance with the subject matter of the present disclosure.

Turning now to FIGS. 8A-8C, shown is an embodiment of AIMS 100 comprising support layer assembly 400, which, in turn, comprises a variety of aspects that will now be described in greater detail.

Generally, support layer assembly 400 may be seen to comprise a plurality of support layers 110, individual ones of which are designated in FIGS. 8A and 8C as support layers 110a-110i. Certain further details of construction of support layers 110a-110i may be seen with reference to FIGS. 8B and 8C. It is noted that, in some embodiments, ⅛" 6061 aluminum alloy is used as a preferred material for support layers 110.

Best seen with reference to FIG. 8A, support layers 110a-110i are assembled into the configuration shown, and are made structurally sound, through use of a plurality of tension assemblies such as were described in greater detail hereinabove. For example, in the embodiment of support layer assembly 400 shown in FIGS. 8A-8C, tension assemblies 120 may be utilized. When support layers 110 are connected by tension assemblies 120 and tension assemblies 120 are sufficiently tightened, as described hereinabove, support layer assembly 400 is made rigid and structurally integral.

Accordingly, common to support layers 110a-110i are a plurality of clearance holes 410. For clarity of meaning, it is here noted that in FIG. 8C, a reference to a feature in a specified number of "places" designates that said feature is present in the referenced number of support layers 110 and in corresponding positional alignment. Thus, and for example, a drawing reference to clearance hole "410 (8 places)" designates that said clearance hole 410 is present in corresponding positional alignment within each of eight (8) layers support layers 110. In this regard, it may be seen that respective ones of clearance holes 410 are mutually aligned with corresponding ones of clearance holes 410 within others of support layers 110a-110i, so that tension rod 130 of tension assembly 120 cooperatively may pass therethrough for the purposes described hereinabove. Certain ones of clearance holes 410 may be of different—or differing—diameter, such as, by way of non-limiting example, clearance holes 412, in order to accommodate features of tension assembly 120, such as tension cap 132, terminating end 134, or the like.

Similarly, a plurality of clearance holes 414 are mutually aligned with corresponding ones of clearance holes 414 within support layers 110a-110i so that rod system 280 cooperatively may pass therethrough for purposes of mounting or otherwise affixing AIMS 100 to another structure, such as was described hereinabove.

Support layers 110c and 110h are configured so as to provide appropriate structure for support of upper drawer 180 and lower drawer 190. In this regard, each slide mount support 416 provides a surface within which may be disposed a plurality of upper slide mount holes 418 for attachment of upper drawer slide rail assembly 185. Similarly, each of support layers 110c and 110h further provide lower surface 420 within which may be disposed a plurality of lower slide mount holes 422 for attachment of lower drawer slide 195.

Each of support layers 110a-110i provide various and further features in order to enable cooperative interaction with cradle assembly 160 such as has been described above. As may be seen with continuing reference to FIG. 8C, support layers 110b, 110e, and 110h provide cradle rear mounting tab bearing surface 424 and cradle front mounting tab bearing surface 426 for cooperative engagement with corresponding cradle layers, each said cradle layer respectively carrying rear mounting tab 163a and front mounting tab 163b. Similarly, it may be observed that cradle mounting tab bearing surfaces 424, 426 are configured so as to provide appropriate lateral bearing surfaces for interaction with GORs 150, as has been previously described. Similarly, support layers 110a, 110c, 110d, 110f, 110g, and 110i provide cradle rest surfaces 428 for cooperative engagement with corresponding cradle layers, and further providing appropriate lateral bearing surfaces for offset tubes 140 and/or associated components of tension assembly 120.

Although the electrical and lighting system of AIMS 100 is explained in greater detail hereinbelow with regard to FIGS. 14A-14D, within each support layer 110a-110i is light diffusing tube clearance 430. In some support layers 110, such as support layers 110d and 110f, lower festoon rail electrical conductor 432 and upper festoon rail electrical conductor 434 are formed in association with, or carried by, light diffusing tube clearance 430. In this regard, when energized by transformer 230, through layers 220, support layers 110d and 110f respectively carry electrical current to, and form an electrical circuit with, a lower festoon rail and an upper festoon rail, to be described in greater detail hereinbelow, whereupon light features 240 may be activated.

4. Cradle Layer Assembly

Figure 9B:
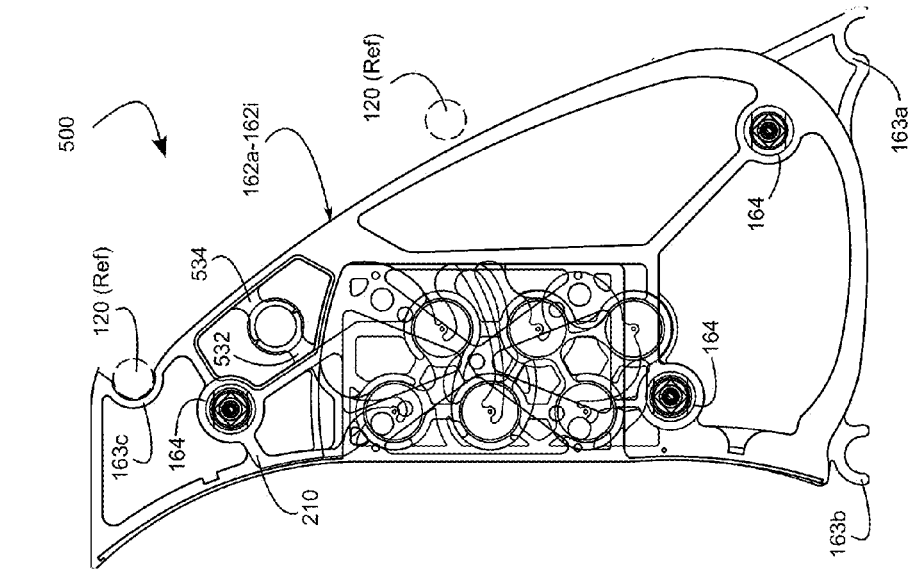
FIG. 9B depicts a side elevation view of the cradle layer assembly of FIG. 9A, in accordance with the subject matter of the present disclosure.
Figure 9A:
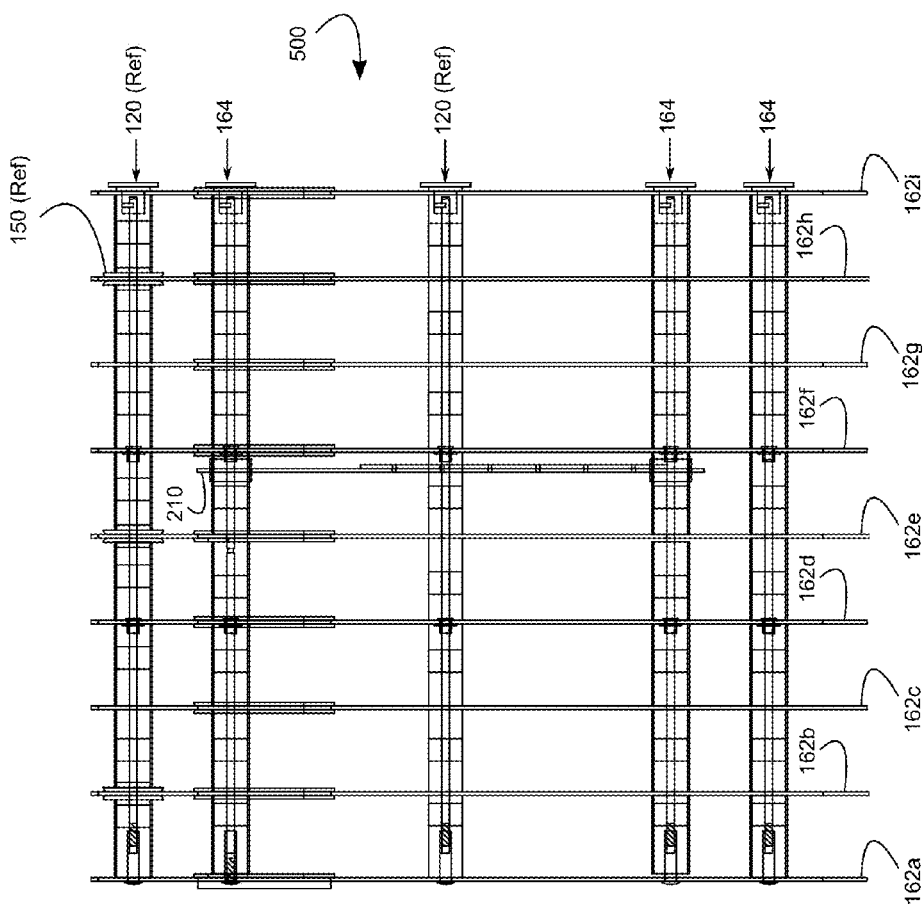
FIG. 9A depicts a front elevation view of a cradle layer assembly of the aircraft interior modular system shown in FIG. 1, in accordance with the subject matter of the present disclosure.
Figure 9C:
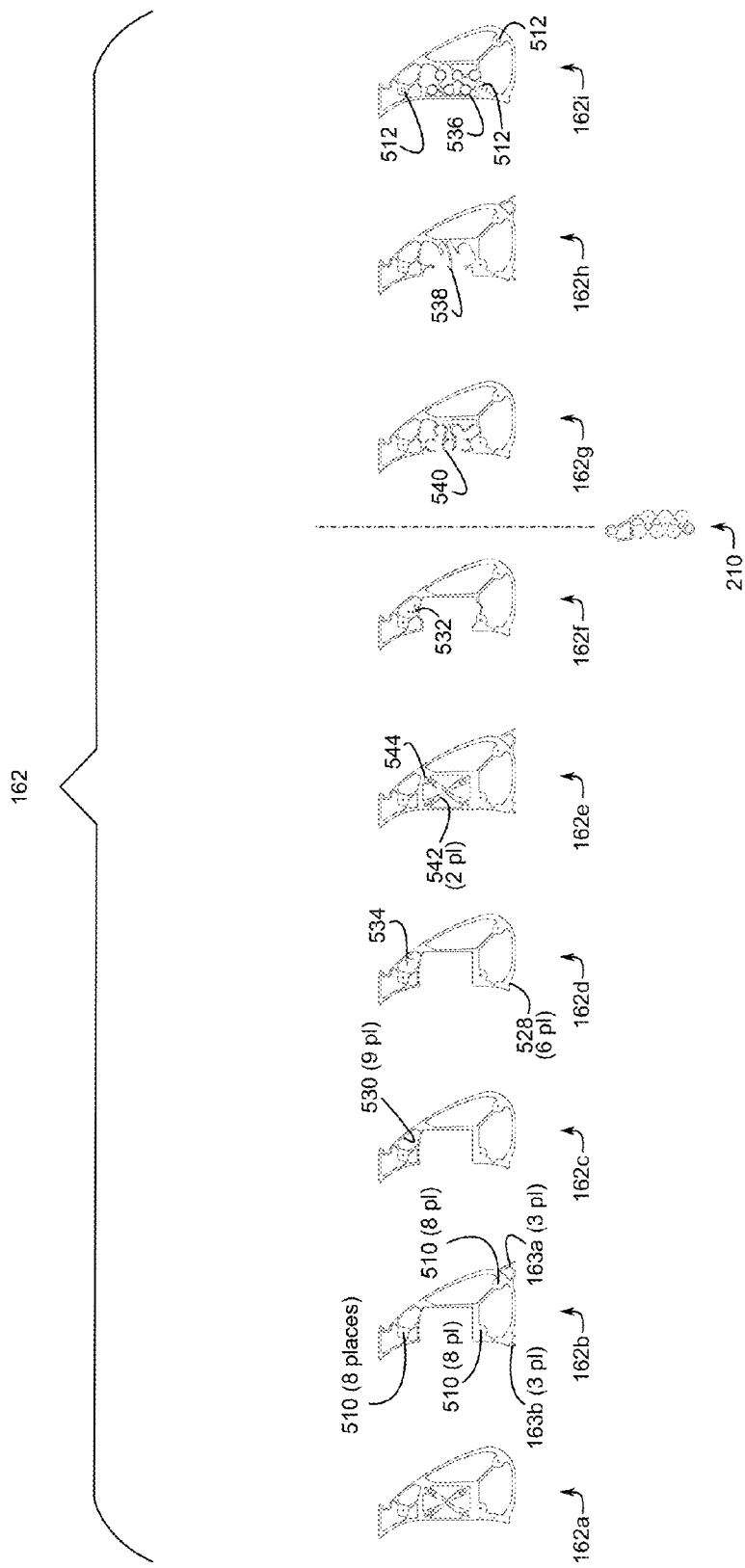
FIG. 9C depicts an exploded elevation view detailing each cradle layer shown in FIGS. 9A and 9B, in accordance with the subject matter of the present disclosure.

Turning now to FIGS. 9A-9C, shown is an embodiment of AIMS 100 comprising cradle layer assembly 500. Cradle layer assembly 500 forms a structural framework for cradle assembly 160, which is configured, as will be described in further detail hereinbelow, to cooperatively fit within and engage support layer assembly 400. Cradle layer assembly 500 further comprises a variety of aspects that will now be described in greater detail.

The reader will now have an appreciation for the layered construction of AIMS 100, wherein the plurality of support layers 110a-110i forming, in part, support layer assembly 400 have corresponding ones of support layers 162a-162i forming, in part, cradle layer assembly 500. Generally, cradle layer assembly 500 may be seen to comprise a plurality of cradle layers 162, individual ones of which are designated in FIGS. 9A and 9C as cradle layers 162a-162i. Certain further details of construction of cradle layers 162a-162i may be seen with reference to FIGS. 9B and 9C. It is noted that, in some embodiments, ⅛" 6061 aluminum alloy is used as a preferred material for cradle layers 162.

Best seen with reference to FIG. 9A, cradle layers 162a-162i are assembled into the configuration shown, and are made structurally sound, through use of a plurality of tension assemblies such as were described in greater detail hereinabove. For example, in the embodiment of cradle layer assembly 500 shown in FIGS. 9A-9C, tension assemblies 164 may be utilized. When cradle layers 162 are connected by tension assemblies 164 and tension assemblies 164 are sufficiently tightened, as described hereinabove, cradle layer assembly 500 is made rigid and structurally integral.

Accordingly, common to cradle layers 162a-162i are a plurality of clearance holes 510. For clarity of meaning, it is here noted that in FIG. 9C, a reference to a feature in a specified number of "places" or "pl" designates that said feature is present in the referenced number of cradle layers 162 and in corresponding positional alignment. Thus, and for example, a drawing reference to clearance hole "510 (8 places)" or "510 (8 pl)" designates that said clearance hole 510 is present in corresponding positional alignment within each of eight (8) cradle layers 162. In this regard, it may be seen that respective ones of clearance holes 510 are mutually aligned with corresponding ones of clearance holes 510 within others of support layers 162a-162i, so that tension rod 166 of tension assembly 164 cooperatively may pass therethrough for the purposes described hereinabove. Certain ones of clearance holes 510 may be of different—or differing—diameter, such as, by way of non-limiting example, clearance holes 512, in order to accommodate features of tension assembly 164, such as tension cap 132, terminating end 134, or the like.

It may be observed that cradle layers 162 are configured so that regions surrounding clearance holes 510, 512 act to provide appropriate lateral bearing surfaces for interaction with GORs 150, as has been previously described, and further provide appropriate lateral bearing surfaces for offset tubes 140 and/or associated components of tension assembly 164.

Each of cradle layers 162a-162i provide various and further features in order to enable cooperative interaction with support layer assembly 400, such as have been described above. As may be seen with continuing reference to FIG. 9C, cradle layers 162b, 162e, and 162h carry rear mounting tab 163a and front mounting tab 163b for cooperative engagement with cradle rear mounting tab bearing surface 424 and cradle front mounting tab bearing surface 426, respectively, of corresponding support layers 110b, 110e, and 110h. As has been previously described, support layers 110a, 110c, 110d, 110f, 110g, and 110i provide cradle rest surfaces 428 for cooperative engagement with curvature 528 of corresponding cradle layers 162a, 162c, 162d, 162f, 162g, and 162i.

Although the electrical and lighting system of AIMS 100 is explained in greater detail hereinbelow with regard to FIGS. 14A-14D, within each cradle layer 162a-162i is light diffusing tube clearance 530. In some cradle layers 162, such as cradle layers 162d and 162f, lower festoon rail electrical conductor 532 and upper festoon rail electrical conductor 534 are formed in association with, or carried by, light diffusing tube clearance 530. In this regard, when energized by transformer 230, through layers 220 and support layers 110d and 110f, cradle layers 162d and 162f, respectively, carry electrical current to, and form an electrical circuit with, a lower festoon rail and an upper festoon rail, to be described in greater detail hereinbelow, whereupon light features 240 may be activated.

It was mentioned above that AIMS 100 may be configured so as to removably clasp and hold items, such as glassware or stemware 200, through the use of sliding retaining layer 210, such as may now be seen to be associated with cradle layer assembly 500. Accordingly, and with continuing reference to FIG. 9C, it may be seen that cradle layer 162i may be provided with features 536, configured in ring-like form in the embodiment shown, for cooperatively supporting and holding the feet of a select number of stemware 200. Cradle layer 162h may be provided with features 538, configured in arm-like form in the embodiment shown, for cooperatively supporting and holding the stems of a select number of stemware 200. And cradle layer 162g may be provided with features 540, configured in C-shaped form in the embodiment shown, for cooperatively supporting and holding the rim or bowl portions of a select number of stemware 200. For example, in the embodiment of FIGS. 9A-9C, cradle layer assembly 500 is configured to removably clasp and hold six (6) pieces of stemware 200, such as wine glasses, champagne flutes, or the like. It further may be seen that sliding retainer layer 210 may be cooperatively engaged within cradle layer assembly 500 between cradle layers 162g and 162f. In such configuration, retainer layer 210 acts as an end cap or end plate adjacent to, or abutting, stemware 200 rims in order to prevent stemware 200 from vibrating and/or disengaging from cradle layer assembly 500 during transit. As will be described in greater detail hereinbelow, retainer layer 210 may be moved laterally away from the rims of stemware 200 in order to provide sufficient clearance for removal of selected pieces of stemware 200, and moved back into adjacent or abutting position to prevent vibration and/or disengagement of the remainder.

Similarly, cradle layers 162a and 162e may be configured with X-shaped structures 542 for constraining lateral motion of appliance mount 170, and/or for matching and aligning with equivalent features encompassed within adjacent end layers of appliance mount 170. It will be appreciated that holes or openings 544 may be provided to lighten cradle layers 162a and 162e, as preferred and/or required.

5. Sliding Retaining Layer

Figure 10C:
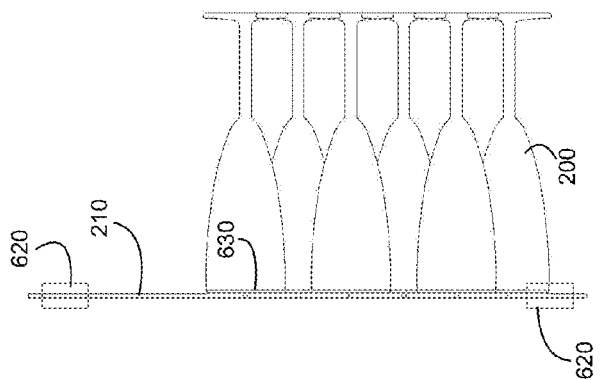
FIG. 10C depicts a front elevation view of a portion of the sliding retaining assembly shown in FIG. 10A, in accordance with the subject matter of the present disclosure.
Figure 10B:
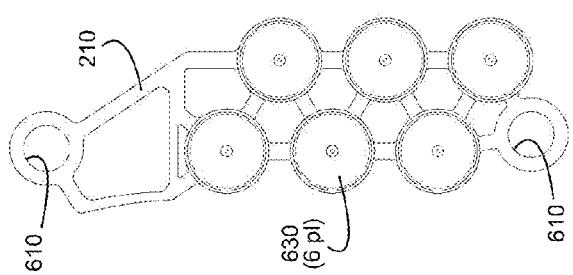
FIG. 10B depicts a side elevation view of a portion of the sliding retaining layer assembly of FIG. 10A, in accordance with the subject matter of the present disclosure.
Figure 10A:
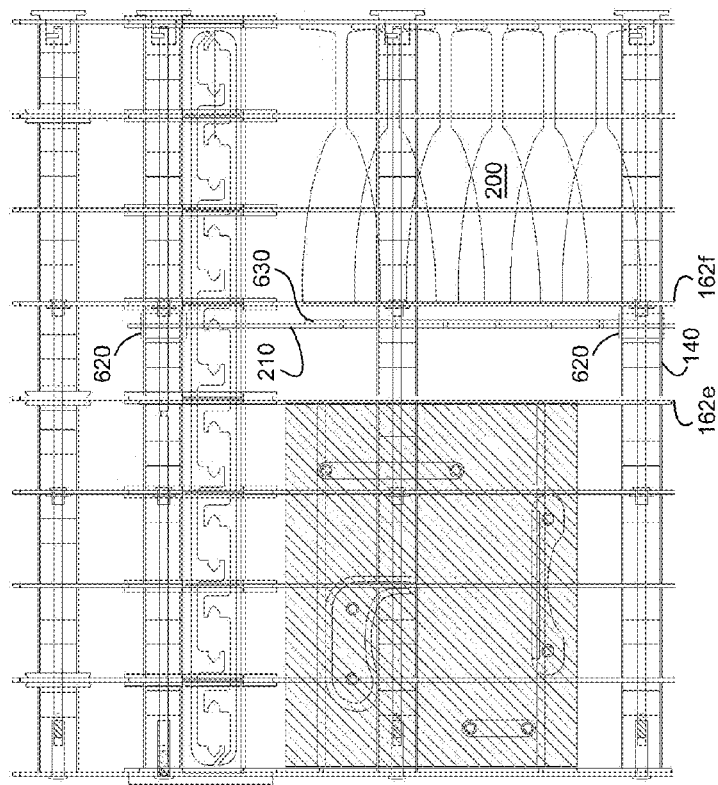
FIG. 10A depicts a front elevation view of a cradle assembly of the aircraft interior modular system shown in FIG. 1, further illustrating a sliding retaining layer assembly thereof, in accordance with the subject matter of the present disclosure.

Turning now to FIGS. 10A-10C, shown is an embodiment of AIMS 100 comprising cradle assembly 160. It was described above that, in order to removably clasp and hold items, such as glassware or stemware 200, sliding retaining layer 210 may be cooperatively engaged within cradle layer assembly 500 between cradle layers 162g and 162f.

Best seen with reference to FIG. 10B, sliding retaining layer 210 may be provided with holes 610. As may be seen with continuing reference to FIG. 10A, holes 610 are cooperatively engaged with gliding mounting sleeves 620. Gliding mounting sleeves 620 are similarly disposed between cradle layers 162g and 162f and are configured in size and dimension to be able to laterally traverse corresponding ones of offset tubes 140.

Sliding retaining layer 210 also may be provided with internal glass retainers 630. Internal glass retainers 630 are configured so as to fit within, and so as to further support from the interior, the rims of stemware 200 when sliding retaining layer 210 is brought into adjacent or abutting configuration with stemware 200 rims.

Accordingly, when a user wishes to ensure that stemware 200 is firmly clasped into position, through lateral motion of gliding mounting sleeves 620, sliding retaining layer 210 and internal glass retainers 630 may be brought into adjacent or abutting configuration with stemware 200 rims in order to prevent stemware 200 from vibrating and/or disengaging from cradle layer assembly 500 during transit. When a user wishes to release stemware 200 from clasped position, through lateral motion of gliding mounting sleeves 620, sliding retaining layer 210 and internal glass retainers 630 may be moved laterally away from the rims of stemware 200 in order to provide sufficient clearance for removal of selected pieces of stemware 200, and subsequently moved back into adjacent or abutting position, as described, in order to prevent vibration and/or disengagement of the remainder.

6. Upper Drawer Assembly

Figure 11B:
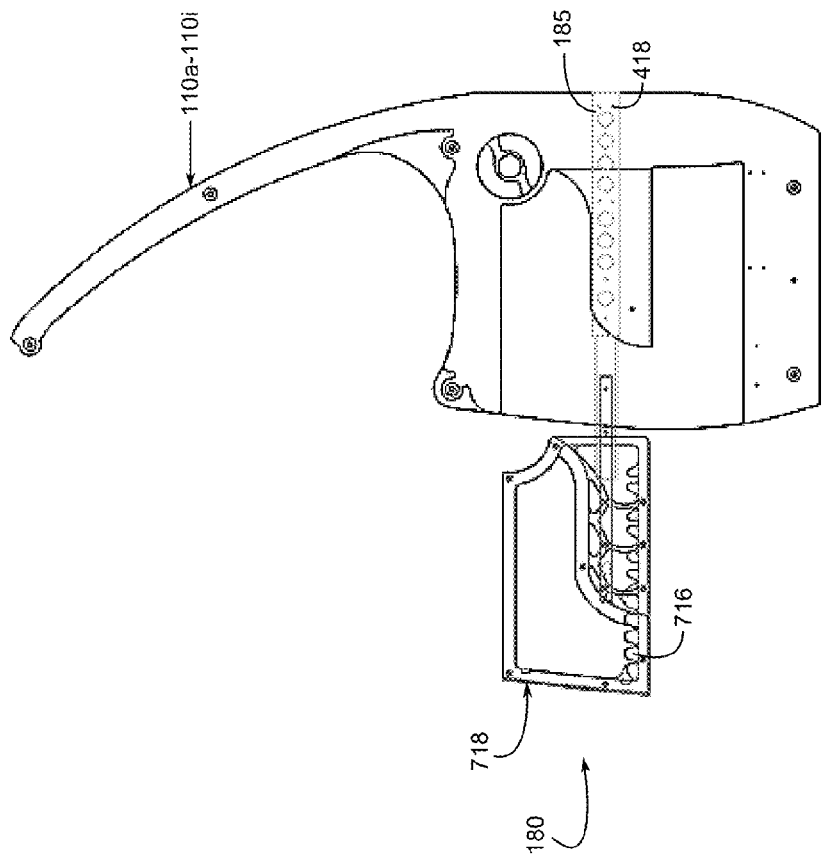
FIG. 11B depicts a side elevation view of a support layer assembly of the aircraft interior modular system shown in FIG. 1, further illustrating an upper drawer assembly, in open position, associated with the referenced support layer assembly in accordance with the subject matter of the present disclosure.
Figure 11A:
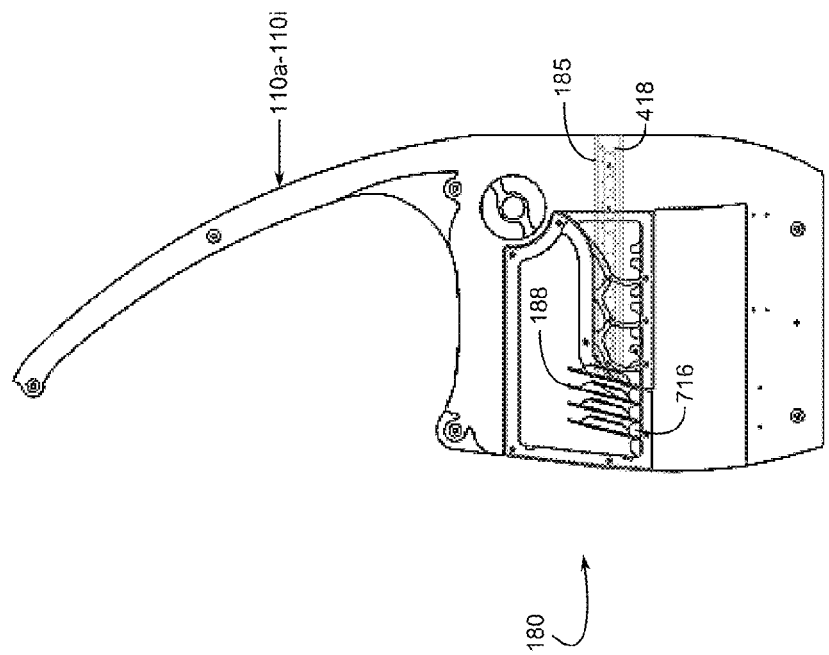
FIG. 11A depicts a side elevation view of a support layer assembly of the aircraft interior modular system shown in FIG. 1, further illustrating an upper drawer assembly, in closed position, associated with the referenced support layer assembly, in accordance with the subject matter of the present disclosure.
Figure 11C:
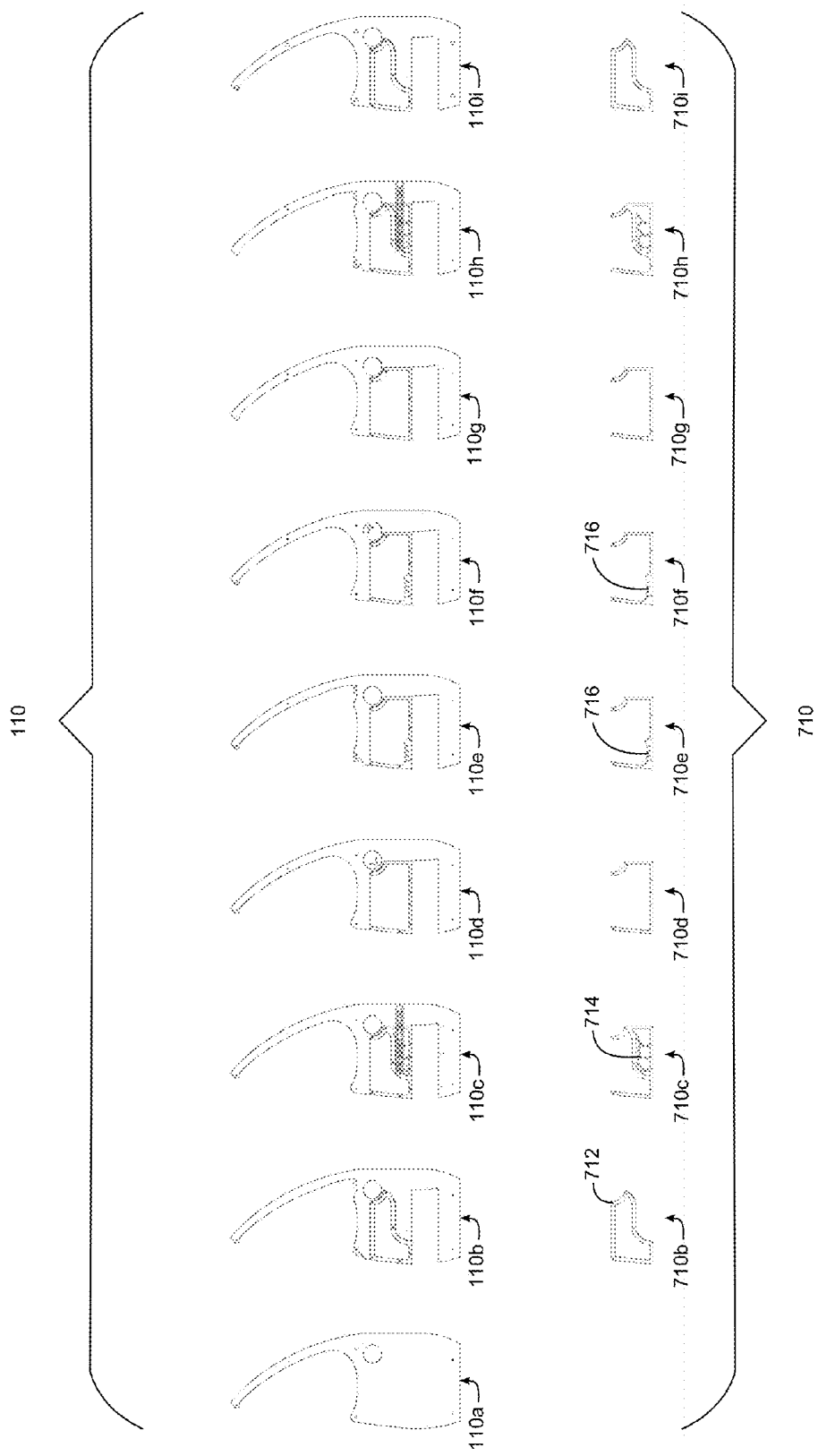
FIG. 11C depicts an exploded side elevation view detailing each support layer aligned with a corresponding upper drawer assembly layer, and further detailing each upper drawer assembly layer, in accordance with the subject matter of the present disclosure.

Turning now to an upper drawer assembly demonstrated within AIMS 100, FIGS. 11A-11C depict support layer assembly 400 in cooperative association with upper drawer assembly 180. As depicted in FIGS. 8A-8C, support layer assembly 400 comprises support layers 110a-110i. Corresponding to each support layer 110b-110i is a respective upper drawer layer 710b-710i, which is best seen with reference to FIG. 11C. It will be noted that FIG. 11C depicts each upper drawer layer 710b-710i in closed position within its corresponding support layer 110b-110i. Therebelow, FIG. 11C further depicts the details of construction of each referenced upper drawer layer 710b-710i.

It will be appreciated that, like support layers 110 and cradle layers 162, each upper drawer layer 710b-710i is configured for a purpose specific to its location within upper drawer assembly 180. For example, each of upper drawer layers 710b-710i are configured with a plurality of holes 712 allowing them to be joined together in modular form via tension assemblies analogous to those detailed hereinabove; to with, via appropriately scaled tension rods, offset tubes, and like component parts, as may be required.

In the embodiment shown, upper drawer layers 710c and 710h are further configured with a plurality of holes 714, in cooperative location with slide mount holes 418 within corresponding support layers 110c and 110h. Such configuration enables attachment of drawer slide rail assemblies 185 to upper drawer layers 710c and 710h, as will be described in greater detail below.

Upper drawer layers 710e and 710f may be configured with tableware or dishware 188 support rack 716. Best seen with reference to FIG. 11A, support rack 716 may enable convenient and organized arrangement and storage of, and user access to, tableware or dishware 188, flatware, serving pieces, and/or the like, disposed within upper drawer assembly 180.

Upper drawer slide rail assemblies 185 are affixed to support layers 110a and 110h via slide mount holes 418 in the referenced support layers. Upper drawer assembly 180 is affixed on a first side via layer 710c to a first drawer slide rail assembly 185 associated with support layer 110c. Upper drawer assembly 180 is affixed on a second side via layer 710h to a second drawer slide rail assembly 185 associated with support layer 110h. In this configuration, upper drawer assembly 180 is operable between an open and a closed position, best seen with reference to FIGS. 11A and 11B.

It is noted that finishing layers optionally may be applied and/or affixed to appropriate ones of upper drawer layers 710b, 710i, front face 718 of upper drawer assembly 180, and/or the like, in order to provide a pleasing aesthetic surface matching that of other portions of AIMS 100, as will be further detailed below.

7. Lower Drawer Assembly

Figure 12C:
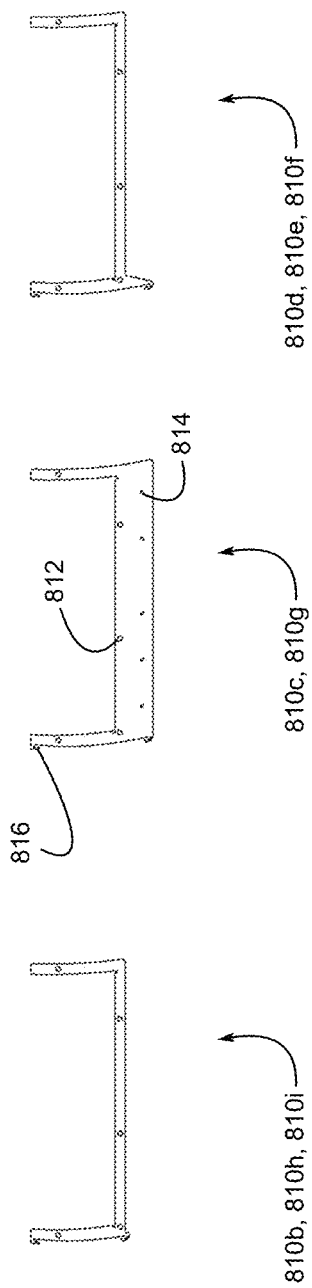
FIG. 12C depicts an exploded side elevation view detailing each lower drawer assembly layer, in accordance with the subject matter of the present disclosure.
Figure 13B:
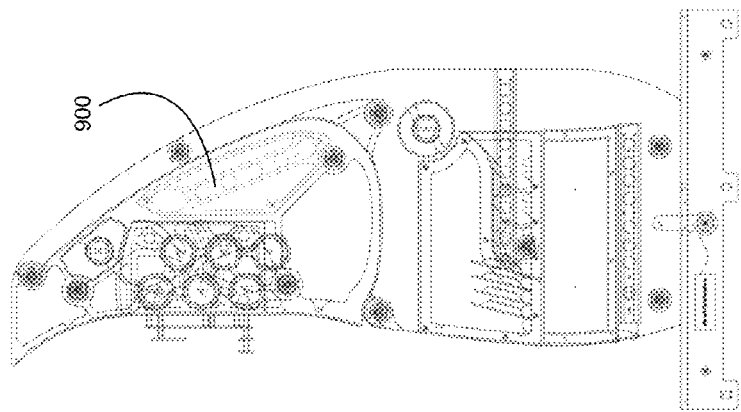
FIG. 13B depicts a first side elevation view of the aircraft interior modular system of FIG. 13A, further illustrating a first side elevation view of the reconfigurable sectional modularity, in accordance with the subject matter of the present disclosure.
Figure 13A:
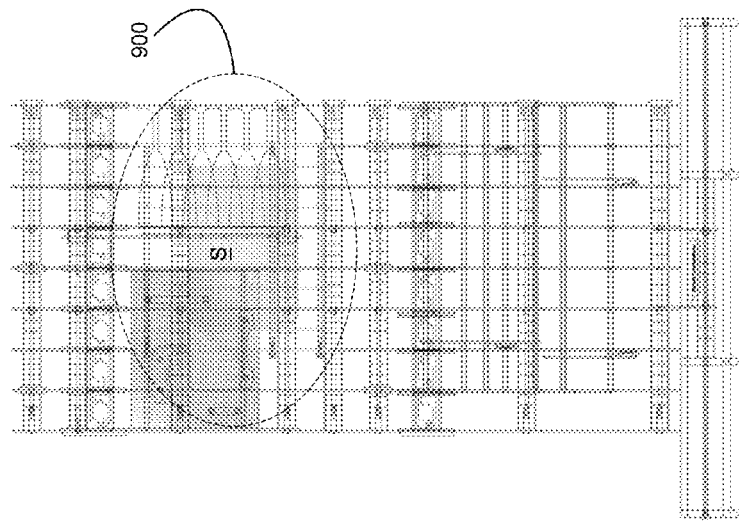
FIG. 13A depicts a front elevation view of the aircraft interior modular system shown in FIG. 1, further illustrating an embodiment of a reconfigurable sectional modularity, in accordance with the subject matter of the present disclosure.
Figure 13C:
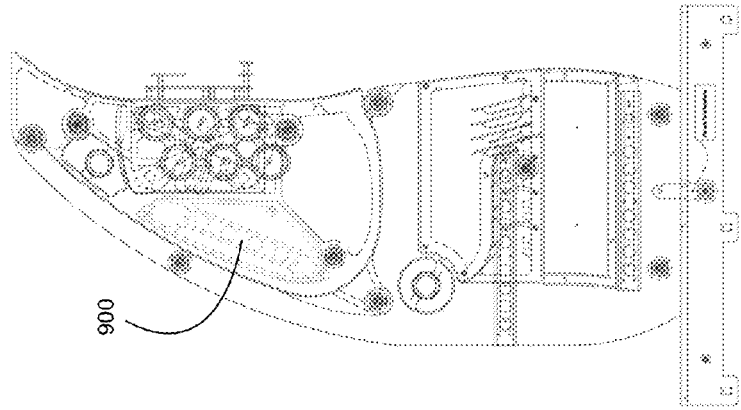
FIG. 13C depicts a second side elevation view of the aircraft interior modular system of FIG. 13A, further illustrating a second side elevation view of the reconfigurable sectional modularity, in accordance with the subject matter of the present disclosure.
Figure 13D:
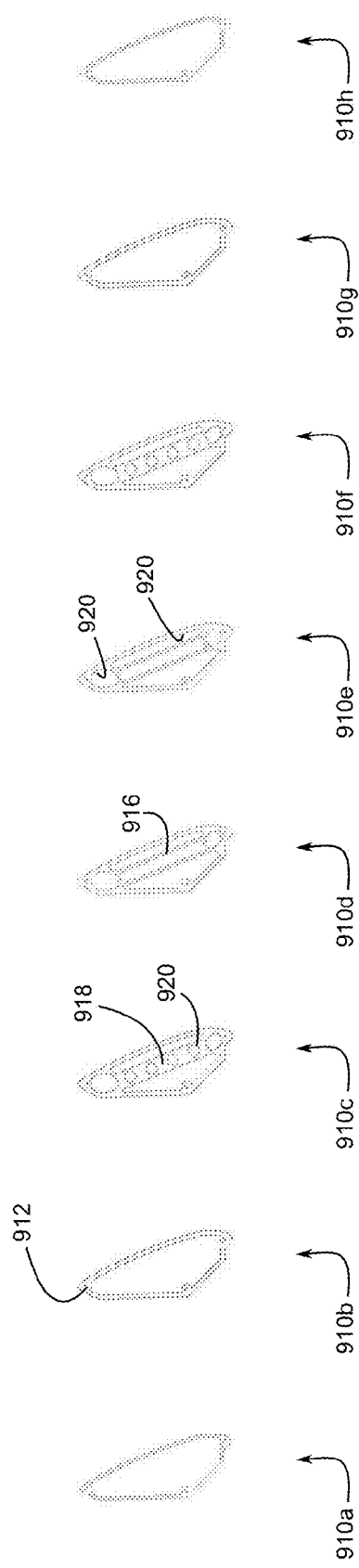
FIG. 13D depicts an exploded side elevation view detailing each reconfigurable sectional modularity layer, in accordance with the subject matter of the present disclosure.

Turning now to a lower drawer assembly demonstrated within AIMS 100, FIGS. 12A-12C depict support layer assembly 400 in cooperative association with lower drawer assembly 190. As depicted in FIGS. 8A-8C, support layer assembly 400 comprises support layers 110a-110i. Corresponding to each support layer 110b-110i is a respective lower drawer layer 810b-810i, which is best seen with reference to FIG. 12C. It will be noted that FIG. 12C depicts the details of construction of each referenced lower drawer layer 810b-810i.

It will be appreciated that, like support layers 110 and cradle layers 162, each lower drawer layer 810b-810i is configured for a purpose specific to its location within lower drawer assembly 190. For example, each of lower drawer layers 810b-810i are configured with a plurality of holes 812 allowing them to be joined together in modular form via tension assemblies analogous to those detailed hereinabove; to with, via appropriately scaled tension rods, offset tubes, and like component parts, as may be required.

In the embodiment shown, lower drawer layers 810c and 810g are further configured with a plurality of holes 814, in cooperative location with slide mount holes 422 within corresponding support layers 110c and 110g. Such configuration enables attachment of drawer slide rail assemblies 195 to lower drawer layers 810c and 810g, as will be described in greater detail below.

Upper drawer slide rail assemblies 195 are affixed to support layers 110a and 110g via slide mount holes 422 in the referenced support layers. Lower drawer assembly 190 is affixed on a first side via layer 810c to a first drawer slide rail assembly 195 associated with support layer 110c. Lower drawer assembly 190 is affixed on a second side via layer 810g to a second drawer slide rail assembly 195 associated with support layer 110g. In this configuration, lower drawer assembly 190 is operable between an open and a closed position, best seen with reference to FIGS. 12A and 12B.

It is noted that finishing layers optionally may be applied and/or affixed to appropriate ones of lower drawer layers 810b, 810i, front face 818 of lower drawer assembly 190, and/or the like, in order to provide a pleasing aesthetic surface matching that of other portions of AIMS 100, as will be further detailed below. In some embodiments, each lower drawer layer 810b-810i may be provided with hook-like features 816 in order to accommodate such aesthetic surface or surfaces, wherein the plurality of hook-like features 816 assembled into lower drawer assembly 190 provide slot-like functionality within which one or more aesthetic surface may be slid into position and, thereby, captured.

8. Reconfigurable Sectional Modularity

FIGS. 13A-13D depict an embodiment of AIMS 100 comprising reconfigurable sectional modularity ("RSM") 900. As with AIMS 100, generally, and with support layers 110, cradle layers 162, upper drawer layers 710, and lower drawer layers 810, specifically, reconfigurable sectional modularity 900 is configured in a plurality of RSM layers 910. Best seen with reference to FIG. 13D, individual RSM layers 910 are designated, respectively, as RSM layer 910a-910i.

RSM 900 serves to provide a submodular mounting system, advantageously taking advantage of open, unutilized space(s) within extant AIMS 100 structure. For example, in the embodiment of FIGS. 13A-13C, RSM 900 may be disposed in association with cradle assembly 170 to carry a structure or device S, such as a flat panel display, an electronics panel, an electronics module, or the like, configured at a location easily viewed by a user.

The function of reconfigurable sectional modularity 900 is to facilitate rapid reconfiguration in defined sections of a system or modular assembly. This functionality enables a user to rapidly mount, swap, reconfigure, and/or add components, structures, devices, modules, and/or the like, that were not present in an original AIMS 100 system. For this reason, it is noted that—unlike previously described AIMS 100 layered modular structures (e.g., support layers 110, cradle layers 162, upper drawer layers 710, and lower drawer layers 810)—RSM layers 910a-910i may not, in some embodiments, correspond to, or align with, other AIMS 100 layers. Rather, RSM 900 is configured so as to mount within AIMS 100, or any aforedescribed substructure thereof, wherein there is appropriate, useful space that may logically and functionally be reconfigured to serve a higher purpose.

As with other, aforedescribed modular structures within AIMS 100, each RSM layer 910a-910i is configured for a purpose specific to its location within AIMS 100. For example, each of RSM layers 910a-910i are configured with a plurality of holes 912 allowing them to be joined together in modular form via tension assemblies analogous to those detailed hereinabove; to wit, via appropriately scaled tension rods, offset tubes, and like component parts, as may be required.

In the embodiment shown, RSM layers 910d and 910e are further configured with a support structure 916, configured and disposed so as to capture, support, and/or mount structure or device S within RSM 900. RSM layers 910e and 910f may be further configured with end portion 918. In this embodiment, end portions 918 serve the purpose of abutting respective ends of structure or device S and, thereby, constraining any lateral motion of structure or device S within RSM 900. It will be further appreciated that any of a variety or combination of holes and/or openings 920 may be provided to lighten RSM layers 910, as preferred and/or required.

9. Electrical and Lighting System

Turning now to FIGS. 14A-14D, depicted is an embodiment of an electrical and lighting system for use in association with AIMS 100. Although certain aspects of the electrical and lighting system previously have been described, further details will now be set forth.

It first should be appreciated that, other than such electrical feeds as may supply transformer 230, AIMS 100 has no electrical wiring or wire ways. The reader will recall that, in the embodiment of AIMS 100 presently described, transformer 230 may comprise a 300 watt, 12 volt transformer. Accordingly, electrical current at 12 volts is conducted through layers of AIMS 100, as has been described hereinabove. Exemplary of such conductive layers are support layers 110d, 110f and cradle layers 162d, 162f. One will recall that, within each support layer 110a-110i is light diffusing tube clearance 430. In some support layers 110, such as support layers 110d and 110f, lower festoon rail electrical conductor 432 and upper festoon rail electrical conductor 434 are formed in association with, or carried by, light diffusing tube clearance 430. In this regard, when energized by transformer 230, through adjacent and contacting layers 220, support layers 110d and 110f respectively carry electrical current to, and form an electrical circuit with, lower festoon rail 1010 and an upper festoon rail 1012, whereupon light features 240 may be activated.

Similarly, one will recall that, within each cradle layer 162a-162i is light diffusing tube clearance 530. In some cradle layers 162, such as cradle layers 162d and 162f, lower festoon rail electrical conductor 532 and upper festoon rail electrical conductor 534 are formed in association with, or carried by, light diffusing tube clearance 530. In this regard, when energized by transformer 230, electrical current is carried through layers 220 and adjacent, contacting support layers 110d and 110f. For clarity of illustration, it might be noted that support layers support layers 110d and 110f make principal electrical contact with cradle layers 162d and 162f along contact surfaces 1018. Cradle layers 162d and 162f, respectively, may then carry electrical current to, and form an electrical circuit with, lower festoon rail 1014 and upper festoon rail 1016, whereupon light features 240 may be activated.

Figure 14B:
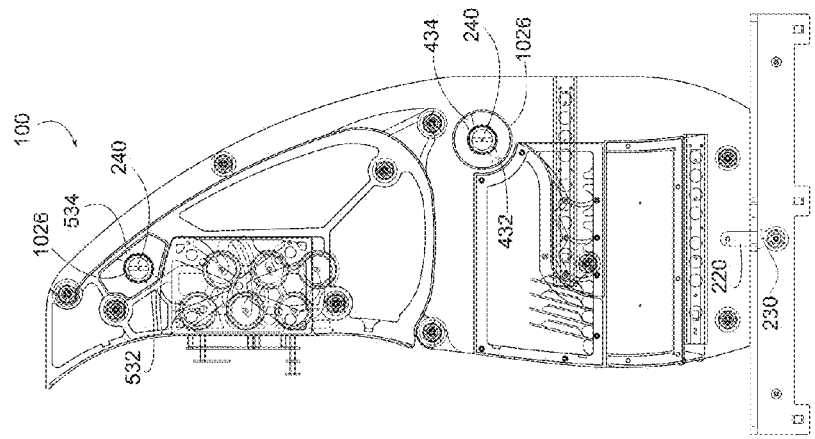
FIG. 14B depicts a first side elevation view of the aircraft interior modular system of FIG. 14A, further illustrating the electrical and lighting system thereof, in accordance with the subject matter of the present disclosure.
Figure 14A:
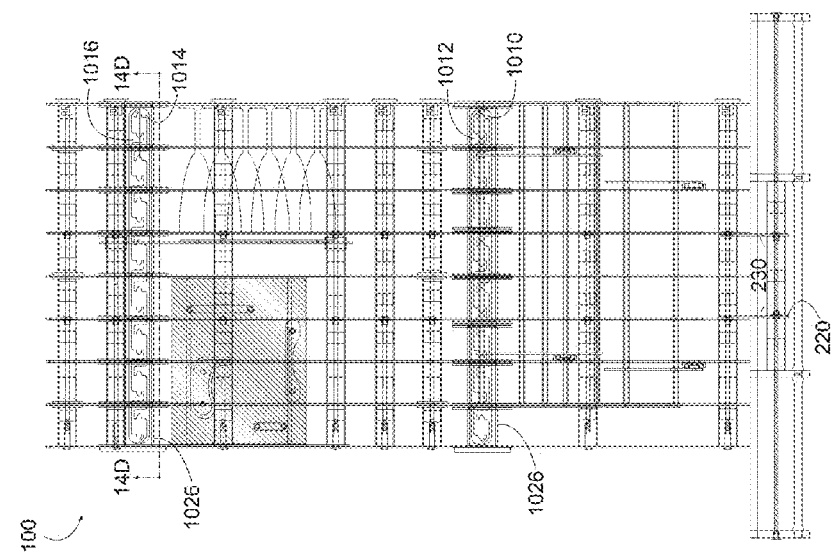
FIG. 14A depicts a front elevation view of the aircraft interior modular system shown in FIG. 1, further illustrating an embodiment of an electrical and lighting system for use therewith, in accordance with the subject matter of the present disclosure.
Figure 14C:
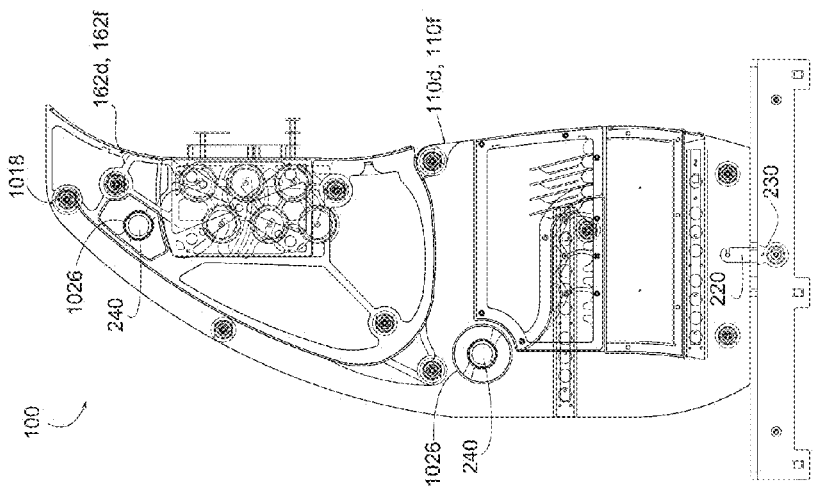
FIG. 14C depicts a second side elevation view of the aircraft interior modular system of FIG. 14A, further illustrating the electrical and lighting system thereof, in accordance with the subject matter of the present disclosure.
Figure 14D:
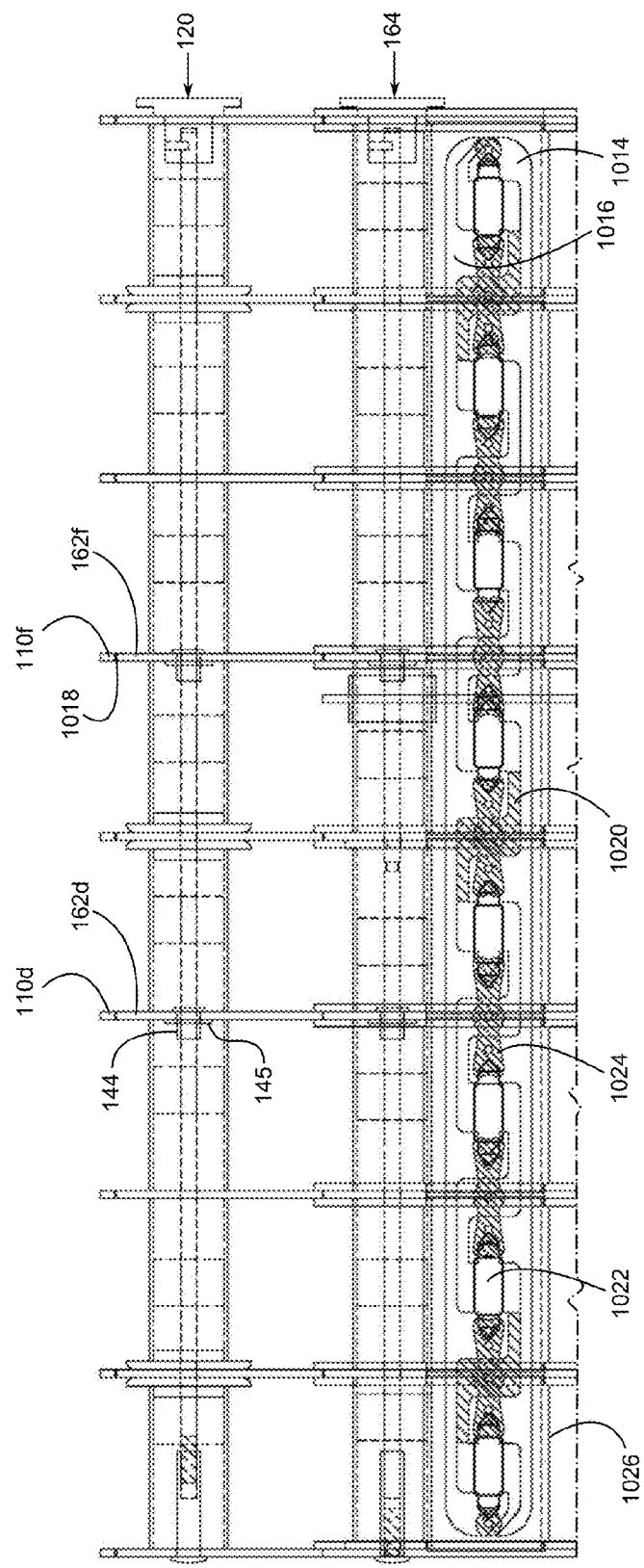
FIG. 14D depicts a front, enlarged partial sectional view of a portion of the aircraft interior modular system of FIG. 14A, further illustrating the electrical and lighting system thereof, in accordance with the subject matter of the present disclosure.

Turning now to FIG. 14D, certain aspects of light features 240 may be seen in greater detail. Lower festoon rail 1014 and upper festoon rail 1016 are separated by festoon rail insulator 1020 Festoon-type lamps 1022 are disposed between lower festoon rail 1014 and upper festoon rail 1016, making electrical contact therewith via batwing festoon retainer 1024. This festoon assembly is encircled by light diffusing tubes 1026.

It should also be noted that, where appropriate, bushings 144 and/or push retainers 145 may comprise, in whole or in part, an insulating material. This, of course, is to prevent electrical current being directed, via tension assemblies 120, 164, from energized layers 110d, 110f, 162d, 162f to other layers that are not intended to be energized.

While the electrical system described hereinabove has been focused upon the useful aspect of energizing light features 240, it will be appreciated that the aforedescribed method of power distribution can be applied for powering any electrical, electronic, or lighting system associated with AIMS 100, including, for example, structure or device S within RSM 900.

10. Surface Panels, Attachment Systems, and Finishes

Turning now to FIGS. 15A-15D, disclosed are exemplary embodiments of side and rear surface panels for use with AIMS 100. FIGS. 15A-15D further depict associated attachment means for each panel.

Figure 15B:
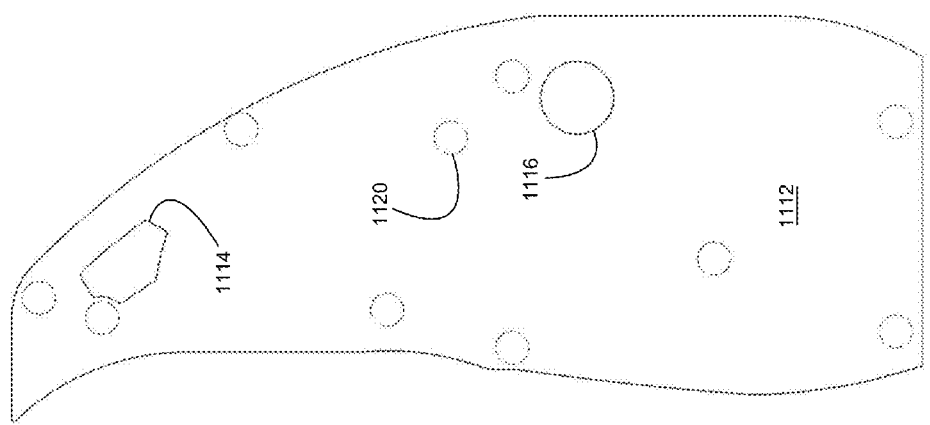
FIG. 15B depicts a second side elevation view of a surface panel for use in association with the aircraft interior modular system shown in FIG. 1, in accordance with the subject matter of the present disclosure.
Figure 15A:
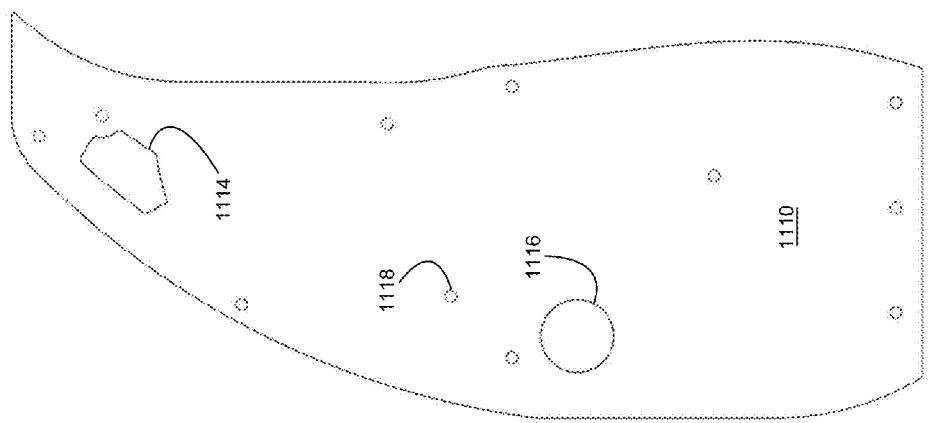
FIG. 15A depicts a first side elevation view of a surface panel for use in association with the aircraft interior modular system shown in FIG. 1, in accordance with the subject matter of the present disclosure.

As may be seen with reference to FIGS. 15A-15B, side panel 1110 is disposed to fit adjacent support layer 110a and cradle layer 162a of AIMS 100. Similarly, side panel 1112 is disposed to fit adjacent support layer 110i and cradle layer 162i of AIMS 100. In some embodiments, openings may be provided within side panels 1110, 1112 to accommodate light assembly end covers 1114, 1116. Light assembly end covers 1114, 1116 may be affixed, by press-fit or other known means, within side panels 1110, 1112. If present, light assembly end covers 1114, 1116 may be transparent, translucent, or opaque, as deemed appropriate for the application and intended use.

Side panel 1110 is configured so as to be engaged with AIMS 100 by press-fitting onto the ends of tension assemblies 120, 164. Accordingly, in some embodiments, reliefs 1118 are formed within an inside surface of side panel 1110 in order to accommodate the outside portions of terminating ends 134, 326, and/or other appropriate structure. In similar fashion, side panel 1112 is configured so as to be engaged with AIMS 100 by press-fitting onto the ends of tension assemblies 120, 164. Accordingly, in some embodiments, reliefs 1120 are formed within an inside surface of side panel 1112 in order to accommodate the outside portions of tension caps 132, 324, and/or other appropriate structure.

So configured, side panels 1110, 1112 act to close out the AIMS system and, further, provide a surface for appropriate aesthetic surface treatment. Such surface treatments may be selected from any of a variety of known types and corresponding attachment and/or application means. For example, a wood-grained surface may be adhered, bonded, applied, or otherwise attached to an outside surface of side panels 1110, 1112 in order to provide a finished, high-quality, cabinet-like appearance. Other surface finishes likewise may be applied or affixed, including metallic surfaces, laminate surfaces, faux surfaces, textile surfaces, and the like, without limitation. In some cases, side panels 1110, 1112 may be finished simply with an attractively colored anodized coating, painted coating, or the like.

Figure 15D:
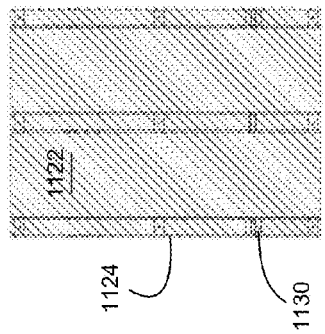
FIG. 15D depicts a partial rear elevation view of the surface panel and attachment means therefor depicted in FIG. 15C for use in association with the aircraft interior modular system shown in FIG. 1, in accordance with the subject matter of the present disclosure.
Figure 15C:
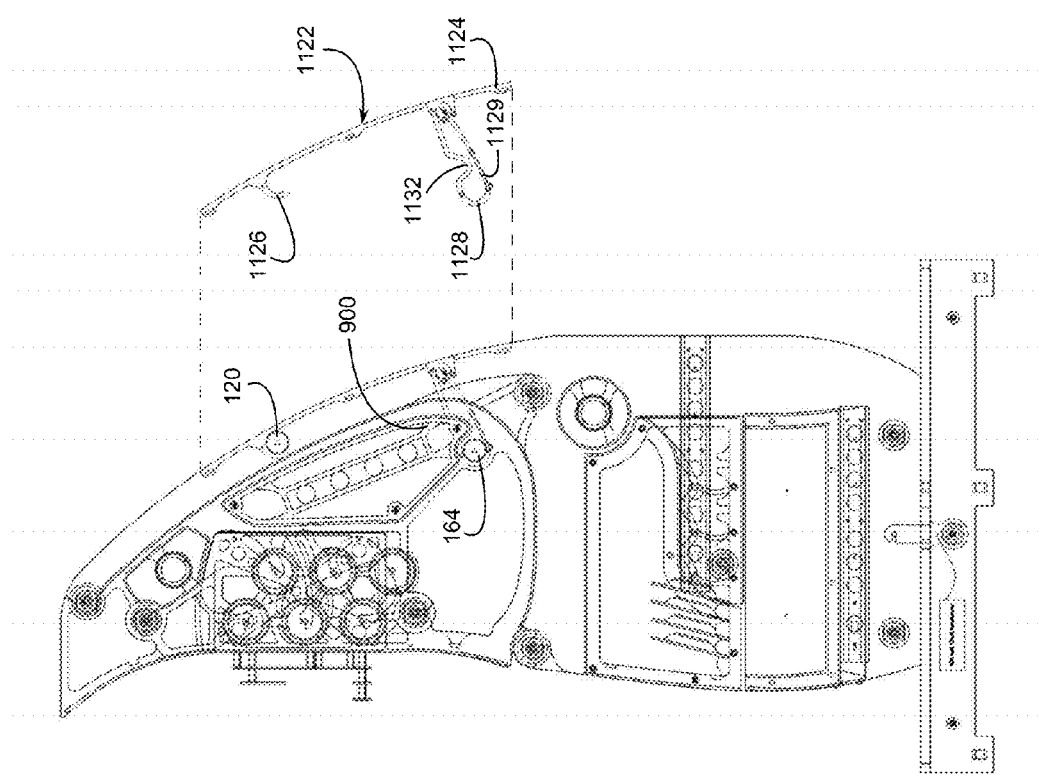
FIG. 15C depicts a partial sectional side elevation view of the aircraft interior modular system shown in FIG. 1, further depicting an embodiment of surface panel and attachment means therefor, in accordance with the subject matter of the present disclosure.

As may be seen with reference to FIGS. 15C-15D, in come embodiments, rear panel 1122 is disposed to fit adjacent the rearward portions of support layers 110a-110i of AIMS 100. In view of the aforedescribed, layered construction of AIMS 100, and as advantageously provided by such layered construction, rear panel 1122 may be affixed to the structure of AIMS 100 via inter-layer attachment points associated with one or more offset tube 140 of tension assemblies 120, 164, or other appropriate structure.

In this regard, a plurality of ribs 1124 may be provided for affixation to an inside surface of rear panel 1122. Ribs 1124 may carry one or more hook-like portion 1126 configured and disposed to be cooperatively attached to tension assembly 120. Ribs 1124 further may carry one or more clasp 1128 configured and disposed to be cooperatively attached to tension assembly 164. In some embodiments, clasp 1128 may be configured to operate in fashion similar to that of a conventional carabineer, wherein keeper portion 1129 may operate assure that rear panel 1122 is firmly locked in position until it is affirmatively released by a user. In some embodiments, rubber bushings 1130 may be provided in association with rib 1124 and clasp 1128 in order to assure that clasps 1128 are appropriately tensioned when engaged with AIMS 100. In some embodiments, one or more of clasp 1128 may be configured with relief 1132. As may best be seen with reference to FIG. 15C, relief 1132 may provide clearance for structures, such as RSM 900, that might otherwise interfere with correct attachment of rear panel 1122 to AIMS 100.

Like side panels 1110, 1112, rear panel 1122 acts to close out the AIMS system and, further, provides a surface for appropriate aesthetic surface treatment. Such surface treatments may be selected from any of a variety of known types and corresponding attachment and/or application means. For example, a wood-grained surface may be adhered, bonded, applied, or otherwise attached to an outside surface of rear panels 1122 in order to provide a finished, high-quality, cabinet-like appearance. Other surface finishes likewise may be applied or affixed, including metallic surfaces, laminate surfaces, faux surfaces, textile surfaces, and the like, without limitation. In some cases, rear panel 1122 may be finished simply with an attractively colored anodized coating, painted coating, or the like.

Although representative attachment means for panels 1110, 1112, and 1122 have been described in detail hereinabove, it will be apparent to one of ordinary skill in the art that other equally sufficient attachment means may be utilized without departing from the scope and spirit of the aforedescribed attachment systems.

11. Single Side Access

As may now be seen from the detailed disclosure set forth above, AIMS 100 advantageously may be entirely constructed, maintained, and/or reconfigured from a single side. This is the case due to the layered structure and design of AIMS 100, in association with its tension assembly-based, layer-interconnection means. Accordingly, layers within each assembly and/or subassembly are assembled in defined order in association with a relevant tension assembly 120, 164. Upon completion of assembly, tension assembly 120, 164 conveniently may be tightened from a single side of AIMS 100, as described above, preferably making use of a single tool, such as a wrench. In some embodiments, a torque-measuring wrench may be utilized to assure that AIMS 100 meets any predefined, applicable performance specifications.

Further, and importantly, should any maintenance and/or reconfiguration of AIMS 100 be required, a technician need simply loosen tension assemblies 120, 164 from a single side of AIMS 100, and subsequently remove only those component parts necessary to access the layer or feature of interest. The technician may then repair, maintain, replace, reconfigure, and/or the like, those component parts of interest; thereafter, replacing subsequent component parts in defined order in association with a relevant tension assembly 120, 164. Upon completion of reassembly, relevant tension assemblies 120, 164 may be retightened from a single side of AIMS 100, as described.

The power of the layered construction, single side access design approach further may be seen in considering interaction of cradle assembly 160, RSM 900, and the like, with support layer assembly 400. Should it be required to remove cradle assembly 160 from AIMS 100, a technician need simply loosen tension assemblies 120, rotate cradle assembly 160 outwardly from AIMS 100, and lift cradle assembly 160 out of association with support layer assembly 400 and AIMS 100. To reinstall cradle assembly 160, one simply reverses the process, aided by operation of cradle mounting tabs 163, GORs 150, and tension assemblies 120, as previously described.

Similarly, should it be required to remove RSM 900 from AIMS 100, a technician need only loosen those component parts necessary to access RSM 900 and, thereafter, to slide it from within AIMS 100. One need merely reverse the process to reinstall RSM 900 into AIMS 100.

The same principal applies with regard to interaction of appliance mount 170 with cradle assembly 160. Should it be required to remove appliance mount 170 from cradle assembly 160 of AIMS 100, a technician need simply loosen tension assemblies 164, rotate appliance mount 170 outwardly from cradle assembly 160, and lift appliance mount 170 out of association with cradle assembly 160 and AIMS 100. To reinstall appliance mount 170, one simply reverses the process, as described above, aided by operation of slot 174, appliance mount lower feet/tabs, GORs 150, and tension assemblies 164.

Although it will be appreciated that, in many embodiments of the present subject matter, single side access will be a preferred configuration and method of construction, application of the present subject matter does not demand it. Rather, the present subject matter contemplates—and accommodates—use of dual-side, multi-side, forward-facing, rear-facing, and other access configurations and methods of construction for systems according to the present disclosure.

12. Other Considerations

Uniquely, and further advantageously, in some embodiments, AIMS 100 may take a curvilinear form very different from conventional, rectilinear modular constructs. In appropriate applications, tension rods 130, 166 within tension assemblies 120, 164 may be replaced with one or more bendable or flexible cable, rope, wire, flexible rod, magnet, electro-magnet, or the like. In association with appropriately shaped and configured spacers, structural members, and component parts, when tension is applied via such flexible tension assemblies, the spaced-apart structural members may be drawn into alignment and held in tightly clamped, curvilinear configuration around a bend.

Similarly, in some embodiments, it will be appreciated that in some modular constructs according to the present subject matter, clamping force may be applied vertically, horizontally, and/or diagonally, as may be helpful, prudent, and/or required to meet the intended application.

With regard to human-factor considerations, by virtue of its advantageous, layered structure, AIMS 100 may be configured so as to provide greater clearance for a user's hips and shoulders than can often easily be obtained with conventional, rectangular modular designs and construction techniques. As may be seen in the various figures, the various AIMS 100 layers may be curved and shaped as may be required for optimal space, user comfort, and convenience, all without sacrificing functionality, strength of the structure, or strength of any attachment interface.

In some applications, such as within the aircraft industry, individual parts must be permanently markable, and marked, with identifying indicia sufficient to provide manufacturing traceability in the event of an in-air/in-service accident. Accordingly, in some embodiments of AIMS 100, individual parts may be permanently stamped, engraved, provided with a distinctive pattern, provided with associated or integral electronic tracking means, or otherwise marked with indicia, or provided with other appropriate means, for identification. Parts may be marked, for example, by metal stamping, by engraving, with fireproof, indelible ink, or the like. In some embodiments, parts may be provided with electronic identification means, such as electronic tracking chips, RFID tags, signal emitting chips, and/or the like. So marked and/or identified, in the event of a catastrophic failure or in-air/in-service accident, any parts recovered may be identified and traced to origin, as may be required by the investigative process.

13. Associated Processes for Cutting, Configuring, and Assembling

When utilizing the features and attributes attendant AIMS 100, such as have been described herein, a designer can evaluate the space available, the functional requirements for use of that space, the highest, best, and most optimal configuration for that space, amongst other considerations, and provide an aesthetically pleasing, functionally and ergonomically superior configuration of modular structure that cannot be achieved by conventional methods. The layered design and construction of AIMS 100, and related modular systems, take best advantage of modern, high speed computer aided design and computer numerically controlled machinery. Parts are quickly and easily cut, identified, finished, inventoried (if desired), and the like. They can be picked and kitted from inventory, provided with assembly instructions, and quickly assembled through use of a single, modest tool, or minimal tools. If desired, parts can be packaged in flat crates, shipped wherever needed, and easily assembled in situ as could not easily be done with prior art methods.

When it comes time to maintain, modify, or reconfigure a modular structure according to the present disclosure, a designer may evaluate the space available, the functional requirements for use of that space, the highest, best, and most optimal configuration for that space, amongst other considerations, and redesign only those layers, component parts, and aspects/attributes of the modular structure as may be necessary. To effectuate the new, reconfigured, and/or modified design, one need disassemble only that which is necessary, and rebuild outwardly from that layer.

Advantageously, the modular construction provided by the present disclosure allows for convenient, inexpensive, and quick substitution of components, assemblies, and subassemblies. One may inventory any such outdated, obsoleted, limited-demand, or limited-cycle parts for eventual reuse; thereby, preserving functionality and avoiding waste. One may provide a catalog of modular system components, subassemblies, and the like, in order to provide convenient, flexible, customizable, and/or personalized modular systems according to the present disclosure.

As the reader may now observe, having the benefit of the detailed disclosures set forth above, there are several distinct advantages and benefits attendant the layered construction so described. For example, each and every layer—of each and every structure and substructure—can be optimized to serve exactly the purpose(s) required of that particular planar space. Each layer can be configured optimally, so as to meet the ergonomic, space, and human factors necessary at precisely that location. Layers may be provided with optimized attachment points between structures. Where structurally appropriate, layers can be designed with open spaces, both within the specific layer and between adjacent layers, in order to save weight and optimize available, useful space. Layers, and the open spaces therewithin, can later be reused and/or reconfigured so as to conveniently and inexpensively add or modify functionality. Layered structures, interconnected with tension assemblies of the sorts described, are lightweight, strong, and rigid, but they can be easily assembled and disassembled with a limited number of simple tools. This is considered especially true for layered structures configured with single-side access features as have been described above. These are, of course, but a few of the advantages and benefits that may be appreciated, recognized, and realized through use of layered structures and methods as set forth in this disclosure.

As will be understood by one of ordinary skill in the art, materials selected for use in a structure constructed according to the subject matter of the present disclosure may be chosen from any having properties acceptable to the application in which the subject matter is to be utilized. For example, particular design constraints might establish particular requirements or have particular design constraints as to tensile, compression, and/or shear strength; deformation and yield characteristics; temperature and other thermal characteristics; impact resistance; suitability for application of particular coatings or finishes; and/or the like. Accordingly, in particular embodiments, one might select materials comprising any of a variety of grades and/or alloys of aluminum, steel, titanium, brass, bronze, and/or other metals; polymers, reinforced polymers, plastics, and thermoplastics; carbon fiber composites; natural materials (e.g., wood); fibrous materials (including, e.g., KEVLAR); composites, laminates, and/or monocoques; and/or other materials, and/or appropriate combinations thereof, without limitation. Essentially, any known structural, engineered or engineering material might be used in association with a selected embodiment configured for an appropriate application.

Accordingly, a desirable and eminently effective solution to the above-described deficiencies in prior art modular constructs and related processes has been provided herein that allows one, in appropriate cases, to avoid the construction of box-like structures; and, thereby, to obviate their many limitations. The solution provided by the subject matter of the present disclosure allows a designer to specify a modular construct that better enables a user to gain access to, and operate within, particularized functional parameters, without hindrance by bulky and space-monopolizing prior art structures.

The subject matter of the present disclosure can be seen to minimize or eliminate joinder of structural panels in conventional "L" or "T"-shaped configurations. The subject matter of the present disclosure also minimizes or eliminates the need to use advanced, expensive, honeycomb materials, while providing for use of materials having appropriate mechanical properties along length and across thickness, at the same time minimizing the required thickness—and, therefore, the weight—of such materials, and, at the end, providing a significantly stronger, yet lighter structure with conventional, relatively lower cost materials.

The subject matter of the present disclosure, further, reduces or removes the need for use of conventional pins, fasteners, adhesives, bonding agents, edge-fill products, and the like. Of course, without the use of conventional fasteners, the subject matter of the present disclosure allows a modular construct to be more rapidly assembled, with a minimal number of required tools, and without custom clamps, fixtures, and/or jigs to hold the panels in fixed and appropriate relative orientation during the assembly process.

The subject matter of the present disclosure reduces design and production cycles. It reduces the need for highly-skilled assemblers. It allows for repeatability between similar modular structures. If in-process error or damage should occur, a modular structure according to the present invention may be easily and inexpensively repaired. Post-delivery or post-hoc reconfiguration and modification can more easily be handled, and with significantly less expense and downtime. Importantly, the subject matter of the present disclosure allows convenient and relatively inexpensive transportation of unassembled components of a modular construct to a desired location, whereafter the modular structure can be efficiently assembled in-situ or on-site; thereby, minimizing or avoiding extended out-of-service situations.

The subject matter of the present disclosure takes advantage of the many benefits accompanying advanced, high-speed manufacturing technologies, such as precision computer numerically controlled water jet cutting, plasma cutting, laser cutting, multi-axis milling and routing, three dimensional ("3D") printing, injection molding, and the like, while avoiding the need for skilled, by-hand lay-up and assembly processes.

The subject matter of the present disclosure enhances, and does not detract from, the highest and best principals of human interface design and ergonomics. Rather, modular constructs built according to the subject matter of the present disclosure better flow into available spaces, reducing footprint and required operating space, while maintaining—or increasing—operational performance, user comfort, and user safety.

And the subject matter of the present disclosure is useful and functional when applied to any of a variety of applications.

Thus, the "form should always serve function" design premise—and desirable solutions implementing it as shown in various embodiments of the present disclosure—can be seen to provide a paradigm shift in design, engineering, manufacturing, fabrication, construction, assembly, and/or like processes; in turn, leading to reductions in human labor, reductions in need for the wide variety of fasteners and corresponding assembly tools, reductions in assembly, manufacturing, and related costs, increases in efficiency, increases in design-to-finished-structure speed and predictability, more efficient and improved scalability, more efficient re-purposing and reconfiguring of the structure, decreased weight, increased usable space, and like benefits. In appropriate cases, such paradigm shift in design, manufacture, fabrication, construction, and/or assembly might provide stronger constructs, improved factors of safety, reductions in failure rates, tunable rigidity, flexibility, and/or vibrational dampening within the modular construct, and like benefits, due to improvements in the way load carrying parts are used, combined, aligned, attached, and integrated into and within the structure.

Accordingly, the many deficiencies and problems pointed-out in the prior art have been resolved, in whole or in part, by the subject matter of the present disclosure, as demonstrated by, and implemented within, the various embodiments shown here within.

Having thus described exemplary embodiments of the subject matter of the present disclosure, it is noted that the within disclosures are exemplary only and that various other alternatives, adaptations, and modifications may be made within the scope and spirit of the present invention. Accordingly, the present subject matter is not limited to the specific embodiments as illustrated herein, but is only limited by the following claims.

What is claimed:
1. An aircraft interior modular system comprising:
  a support layer assembly, said support layer assembly comprising:
    a plurality of structural members in parallel, spaced-apart relationship;
    a tension assembly configured to provide clamping force approximately perpendicularly to a face of each structural member;
      said tension assembly comprising tension means passing through each said structural member;

said tension assembly further passing through a plurality of spacers, each said spacer disposed between, and in endwise, abutting relationship with, two said structural members;

terminating means incident an end one of said plurality of structural members, said terminating means receiving a first end of said tension means in cooperative engagement therewith;

tension cap means incident another end one of said plurality of structural members, said tension cap means receiving a second end of said tension means in cooperative engagement therewith;

said tension cap means operable with said tension means, said structural members, said spacers, and said terminating means to develop tensile force within said tension means and corresponding compression force within said spacers, whereupon said plurality of structural members are drawn into alignment and provide structural integrity of the aircraft interior modular system; and means for attaching the aircraft interior modular system to an interior structure of an aircraft.

2. The aircraft interior modular system of claim 1 wherein said tension means is a rod.

3. The aircraft interior modular system of claim 2 wherein said rod comprises a variable diameter portion.

4. The aircraft interior modular system of claim 2 wherein said first end of said tension means threads into said terminating means.

5. The aircraft interior modular system of claim 4 wherein said second end of said tension means is affixed to said tension cap means, whereby rotation of said tension cap means acts to develop said tension force within said tension means.

6. The aircraft interior modular system of claim 1 wherein said tension assembly further comprises a guiding offset rest.

7. The aircraft interior modular system of claim 1 wherein said tension assembly further comprises an internal offset tube retainer.

8. The aircraft interior modular system of claim 1 wherein said tension assembly is released and tightened via single side access means.

9. The aircraft interior modular system of claim 1 wherein a structural member of said support layer assembly is electrically energized.

10. The aircraft interior modular system of claim 9 further comprising a lighting system powered by said electrically energized structural member of said support layer assembly.

11. The aircraft interior modular system of claim 1 further comprising a cradle assembly.

12. The aircraft interior modular system of claim 11 wherein said cradle assembly comprises:

a plurality of structural layers in parallel, spaced-apart relationship;

a tension assembly configured to provide clamping force approximately perpendicularly to a face of each structural layer;

said tension assembly comprising tension means passing through each said structural layer;

said tension assembly further passing through a plurality of spacers, each said spacer disposed between, and in endwise, abutting relationship with, two said structural layers;

terminating means incident an end one of said plurality of structural layers, said terminating means receiving a first end of said tension means in cooperative engagement therewith; and tension cap means incident another end one of said plurality of structural layers, said tension cap means receiving a second end of said tension means in cooperative engagement therewith;

said tension cap means operable with said tension means, said structural layers, said spacers, and said terminating means to develop tensile force within said tension means and corresponding compression force within said spacers, whereupon said plurality of structural layers are drawn into alignment and provide structural integrity of the aircraft interior modular structure.

13. The aircraft interior modular system of claim 12 wherein said structural layers of said cradle assembly correspond to, and align with, said structural members of said support layer assembly.

14. The aircraft interior modular system of claim 12 wherein a guiding offset rest associated with said tension assembly of said support layer assembly cooperatively receives a portion of a structural layer of said cradle.

15. The aircraft interior modular system of claim 12 wherein said tension assembly of said cradle assembly is released and tightened via single side access means.

16. The aircraft interior modular system of claim 12 further comprising a sliding retaining layer.

17. The aircraft interior modular system of claim 12 wherein a structural layer of said cradle assembly is electrically energized.

18. The aircraft interior modular system of claim 17 further comprising a lighting system powered by said electrically energized structural layer of said cradle assembly.

19. The aircraft interior modular system of claim 12 wherein a structural layer of said cradle assembly is electrically energized via contact with a corresponding electrically energized structural member of said support layer assembly.

20. The aircraft interior modular system of claim 12 further comprising an appliance mount comprising parallel, spaced apart layers interconnected in tensile constrained form.

21. The aircraft interior modular system of claim 12 further comprising a reconfigurable sectional modularity comprising parallel, spaced apart layers interconnected in tensile constrained form, said reconfigurable sectional modularity operable with, and fitting within, an open space between said cradle structural layers.

22. The aircraft interior modular system of claim 1 further comprising a drawer assembly comprising parallel, spaced apart layers interconnected in tensile constrained form.

23. The aircraft interior modular system of claim 1 further comprising a nonstructural surface panel.

24. The aircraft interior modular system of claim 23 wherein said nonstructural surface panel comprises a side panel affixed by press-fit engagement to an end one of said plurality of structural members of said support layer assembly.

25. The aircraft interior modular system of claim 23 wherein said nonstructural surface panel comprises a facing panel removably affixed to a said tension assembly.

26. The aircraft interior modular system of claim 1 wherein said tension means is selected from the group consisting of a cable, a rope, and a wire.

\* \* \* \* \*